US011423472B2

(12) United States Patent
Kim et al.

(10) Patent No.: US 11,423,472 B2
(45) Date of Patent: Aug. 23, 2022

(54) AUXILIARY BATTERY AND AUXILIARY BATTERY RENTAL DEVICE

(71) Applicant: LIBERGON, INC., Seoul (KR)

(72) Inventors: Joon Hwan Kim, Seoul (KR); Joon Ho Lim, Seoul (KR); Hak Cheon Lee, Seoul (KR); Eui Hwan Choi, Seoul (KR)

(73) Assignee: LIBERGON, INC., Seoul (KR)

( * ) Notice: Subject to any disclaimer, the term of this patent is extended or adjusted under 35 U.S.C. 154(b) by 405 days.

(21) Appl. No.: 16/631,406

(22) PCT Filed: Jul. 23, 2018

(86) PCT No.: PCT/KR2018/008270
§ 371 (c)(1),
(2) Date: Jan. 15, 2020

(87) PCT Pub. No.: WO2019/022452
PCT Pub. Date: Jan. 31, 2019

(65) Prior Publication Data
US 2020/0219178 A1    Jul. 9, 2020

(30) Foreign Application Priority Data

Jul. 24, 2017  (KR) ........................ 10-2017-0093536

(51) Int. Cl.
*G06F 7/08*        (2006.01)
*G06Q 30/06*       (2012.01)
(Continued)

(52) U.S. Cl.
CPC ........... *G06Q 30/0645* (2013.01); *B65G 1/06* (2013.01); *G05B 15/02* (2013.01); *G06Q 10/087* (2013.01);
(Continued)

(58) Field of Classification Search
CPC ............ G06Q 30/0645; G06Q 10/087; G06Q 10/10; G06Q 20/18; B65G 1/06;
(Continued)

(56) References Cited

U.S. PATENT DOCUMENTS 5,088,586 A * 2/1992 Isobe ................... G06Q 20/204
                                                      705/17
7,004,710 B1 * 2/2006 Quade .................. H01M 10/42
                                                     414/400
(Continued)

FOREIGN PATENT DOCUMENTS

JP    2010-068591 A   3/2010
KR  10-2004-0040651 A   5/2004
(Continued)

OTHER PUBLICATIONS

KR101762483B1 Charging unit unattended rental system, English machine translation, 12 pages. (Year: 2022).*
(Continued)

*Primary Examiner* — Tuyen K Vo
(74) *Attorney, Agent, or Firm* — Maschoff Brennan

(57) ABSTRACT

The present invention relates to an auxiliary battery and an auxiliary battery rental device, and the auxiliary battery rental device according to the present invention comprises: a battery port allowing an auxiliary battery to be discharged therefrom or returned thereto; a battery queue in which auxiliary batteries are vertically stacked and loaded; a carrier for discharging an auxiliary battery loaded in the battery queue to the battery port, or loading an auxiliary battery returned to the battery port in the battery queue; a lift for lifting at least some of the auxiliary batteries loaded in the battery queue; a charging unit for charging at least some of the auxiliary batteries loaded in the battery queue; and a control unit for controlling an operation of the rental device such that lending and returning operations of the auxiliary
(Continued)

batteries are automatically performed. According to the present invention, lending, returning, charging, and lending of auxiliary batteries can be circularly and automatically performed.

13 Claims, 35 Drawing Sheets

(51) Int. Cl.

| | |
|---|---|
| *B65G 1/06* | (2006.01) |
| *G05B 15/02* | (2006.01) |
| *G06Q 10/08* | (2012.01) |
| *G06Q 10/10* | (2012.01) |
| *G06Q 20/18* | (2012.01) |
| *G07F 11/00* | (2006.01) |
| *H01M 10/46* | (2006.01) |
| *H02J 7/00* | (2006.01) |
| *H01M 50/50* | (2021.01) |

(52) U.S. Cl.
CPC .............. *G06Q 10/10* (2013.01); *G06Q 20/18* (2013.01); *G07F 11/005* (2013.01); *H01M 10/46* (2013.01); *H01M 50/50* (2021.01); *H02J 7/0013* (2013.01); *H02J 7/0045* (2013.01); *H01M 2220/30* (2013.01)

(58) Field of Classification Search
CPC .... B65G 57/06; B65G 59/063; B65G 59/067; B65G 60/00; G05B 15/02; G07F 11/005; G07F 7/06; G07F 11/10; G07F 11/165; G07F 15/006; G07F 11/14; G07F 17/00; G07F 17/0042; H01M 10/46; H01M 50/50; H01M 2220/30; H02J 7/0013; H02J 7/0045; Y02E 60/10

See application file for complete search history.

(56) References Cited

U.S. PATENT DOCUMENTS

| | | | |
|---|---|---|---|
| 2008/0005224 A1* | 1/2008 | Ferguson | G06Q 10/10 |
| | | | 709/203 |
| 2014/0368156 A1* | 12/2014 | Aloe | H02J 7/0013 |
| | | | 320/106 |
| 2016/0180632 A1* | 6/2016 | Santana | H02J 7/0027 |
| | | | 700/238 |

FOREIGN PATENT DOCUMENTS

| | | | |
|---|---|---|---|
| KR | 10-2013-0104651 A | 9/2013 | |
| KR | 10-2016-0042596 A | 4/2016 | |
| KR | 10-2016-0123835 A | 10/2016 | |
| KR | 10-1668018 B1 | 10/2016 | |
| KR | 10-1684937 B1 | 12/2016 | |
| WO | WO-2015167476 A1 * | 11/2015 | ................ H02J 7/00 |

OTHER PUBLICATIONS

KR Notification of Reason for Refusal dated Aug. 20, 2018 as received in Application No. 10-2017-0093536.
KR Grant of Patent dated May 21, 2019 as received in Application No. 10-2017-0093536.

* cited by examiner

AUXILIARY BATTERY AND AUXILIARY BATTERY RENTAL DEVICE

TECHNICAL FIELD

The present invention relates to an auxiliary battery suitable for portable electronic devices such as mobile phones, and a rental device therefor.

BACKGROUND ART

Recently, as the portable electronic devices represented by smart phones are increasingly spread rapidly, and functions thereof are diversified, more portable electronic devices are being used instead of printing media such as newspapers during movement such as commute. Although the using time of the portable electronic devices increases remarkably during the day, and the power consumption increases due to high-level function, the capacity growth rate of a battery as a power source for the portable electronic devices cannot meet the demand.

Meanwhile, because a battery of a recent smart phone is not allowed to be attached to and detached from a smart phone body mainly because of the improvement of the waterproof function, it has become substantially impossible to charge the batteries in convenience stores or the like.

Accordingly, many people use their smart phones while carrying an auxiliary battery connected to the smart phone by using a connector cable such as a USB cable. However, the auxiliary battery is required to be charged in advance and to be carried separately in addition to the smart phone.

Meanwhile, patent document 1 (Korean Patent Publication No. 10-1684937 discloses an auxiliary battery automatic lending equipment that automatically borrows and receives auxiliary batteries. Some subway stations are equipped with the auxiliary battery automatic lending equipment. Accordingly, a person who needs a battery may rent an auxiliary battery by operating the lending equipment, and return the used battery to the lending equipment of the same system, thereby relieving the inconvenience of personally recharging and carrying the auxiliary battery.

However, above all, according to the lending equipment disclosed in patent document 1, used batteries are returned through a return port and stored in a collection box inside the lending equipment, and then a management personnel regularly is required to visit, collect and separately charge the discharged batteries collected in the collection box. At this time, the management personnel fills the lending equipment with charged batteries for rental while collecting the discharged batteries. Accordingly, there is a limit that the management personnel is mandatory for the conventional lending equipment and the managing frequency by the management personnel increases for lending equipment installed in places having demands for the batteries.

In addition, according to the auxiliary battery automatic lending equipment disclosed in patent document 1, when the auxiliary battery is rented, an auxiliary battery and a connector cable selected by a user are dropped to an outlet to allow the user to take out, and when the auxiliary battery and the connector cable are returned to a return port by the user upon returning, the battery is inspected (determined whether the battery is defective or the like), and dropped and stored in the collection box. Accordingly, even when an impact absorbing member is provided, an impact may be exerted on the battery, and the battery may be damaged.

Meanwhile, upon returning, for inspection of the returned auxiliary battery, there is an inconvenience that the user is necessary to connect the battery to a connector port provided in the return port through a connector cable. Since unfamiliar users skip the above connection of the connector, the battery is not properly inspected or the return process is incomplete, and thus it may be recorded as an unreturned state.

In other words, the conventional automatic auxiliary battery rental machine merely changes a battery as a subject for rental (sale), and thus, for example, operates with substantially the same structure and manner as vending machines for canned beverages or the like. Accordingly, the management personnel is inevitable. In addition, there are many tasks to be performed by the user while paying attention during rental process.

In addition, since the auxiliary battery rented from the conventional rental machine is a conventional auxiliary battery, a real user may need a connector cable to connect the auxiliary battery to a portable electronic device of the user. Accordingly, the rental machine may lend a separate connector cable together with the battery. However, this may cause problems such as losing the connector cable or returning only the auxiliary battery while forgetting to return the connector cable.

DETAILED DESCRIPTION OF THE INVENTION

Technical Problem

The present invention is provided to solve the above conventional problems. An object of the present invention is to provide an auxiliary battery rental device that circularly and automatically performs lending, returning, charging, and lending auxiliary batteries.

In addition, an object of the present invention is to provide an auxiliary battery having a body and a connector cable integrated with each other to be optimized for automatic rental and return.

Technical Solution

To achieve the above-mentioned objects, an auxiliary battery rental device according to an aspect of the present invention includes: a housing having a battery port for discharging an auxiliary battery for rental and returning the auxiliary battery after use; a rental queue vertically stacked and loaded with auxiliary batteries for rental and configured to discharge the loaded auxiliary batteries one by one according to a rental request of a user; a return queue configured to vertically receive the auxiliary batteries returned by the user one by one so as to stack and load the auxiliary batteries; a charging unit for charging the auxiliary batteries loaded in the return queue or in the return queue and the rental queue; a carrier configured to discharge the auxiliary battery discharged from the rental queue to the battery port according to the rental request of the user, and load an auxiliary battery returned through the battery port by the user onto the return queue; a lift configured to move and load the auxiliary battery loaded in the return queue to the rental queue when the rental queue is empty, when the return queue is full, or when the charging of the auxiliary battery loaded in the return queue is completed; and a control unit configured to control operations of the rental device including the carrier, the charging unit and the lift, in response to the rental request or return action of the user and a state of the auxiliary battery rental device.

The auxiliary batteries may be configured to be rented on a first-in and first-out basis, in which the carrier operates such an auxiliary battery loaded first among the auxiliary batteries loaded on the rental queue is discharged first, and the lift operates to move the auxiliary battery loaded on the return queue to the rental queue, such that an auxiliary battery returned and loaded on the return queue is disposed at a position to be discharged first from the rental queue.

According to one embodiment, the battery port may be a single battery port, the carrier may be installed to have a vertical height fixed at a same height as the battery port, and the rental queue and the return queue are disposed to vertically face each other with the carrier interposed therebetween. Upon the rental operation, the carrier may discharge an auxiliary battery closest to the carrier among the auxiliary batteries loaded on the rental queue to the battery port, and upon the return operation, the carrier may load an auxiliary battery returned to the battery port onto a position closest to the carrier from the return queue. When the auxiliary battery loaded on the return queue moves to the rental queue by the lift, the lift may move the auxiliary battery loaded in the return queue to the rental queue by moving up and down the auxiliary battery through the carrier, in which the auxiliary battery located farthest from the carrier among the auxiliary batteries loaded in the return queue is moved to be loaded at a position closest to the carrier in the rental queue.

In addition, the auxiliary battery rental device may include a plurality of pairs of the rental queue and the return queue vertically arranged opposite to each other in the left and right directions when viewed from a front side of the auxiliary battery rental device. The carrier may be configured to slide left and right after gripping both side surfaces of the auxiliary battery when viewed from the front side of the auxiliary battery rental device. In addition, the carrier may be configured to push out the gripped auxiliary battery toward the front side of the rental device through the battery port or pull and grip the auxiliary battery returned to the battery port.

In addition, each of the rental queue and return queue may include a queue frame configured to limit a loading space of the auxiliary batteries, and a support member provided at the bottom of the queue frame to hold up and support the auxiliary battery loaded at the bottom, wherein the support member may be configured to selectively implement a state of supporting the auxiliary battery loaded at the bottom and a state of releasing the supporting.

In addition, the auxiliary battery rental device according to an embodiment of the present invention may include: a housing having a battery port for discharging an auxiliary battery for rental and returning the auxiliary battery after use; a battery queue vertically stacked and loaded with auxiliary batteries for rental or returned batteries and configured to discharge the loaded batteries one by one from one end of the battery queue according to a rental request of the user, and receive the auxiliary batteries returned by the user one by one so as to load the auxiliary batteries onto the other end thereof; a charging unit configured to charge the auxiliary battery loaded in the battery queue; a carrier configured to discharge the auxiliary battery discharged from the battery queue to the battery port according to the rental request of the user, and load an auxiliary battery returned through the battery port by the user onto the battery queue; a lift configured to, upon the rental operation, move up and down the loaded auxiliary batteries such that the auxiliary battery loaded at the one end among the auxiliary batteries loaded in the battery queue is disposed at a dischargeable position, and upon the return operation, move up and down the loaded auxiliary batteries such that the returned auxiliary battery is loaded on the opposite end; and a control unit configured to control operations of the rental device including the carrier, the charging unit and the lift, in response to the rental request or return action of the user and a state of the auxiliary battery rental device.

The battery port may be a single battery port, the carrier may be installed to have a vertical height fixed at a same height as the battery port, and the lift may be configured to, upon the rental operation, move the loaded auxiliary batteries such that the one end of the lift is positioned with the same height as a height of the carrier, and upon the return operation, move up and down the loaded auxiliary batteries such that the opposite end is positioned at a same height as the height of the carrier.

Alternatively, the battery port may include a discharge port formed at a height corresponding to the one end of the battery queue, and a return port formed at a height corresponding to the opposite end of the battery queue. The carrier may include a rental carrier installed to have a fixed vertical height at a same as a height of the discharge port, and a return carrier installed to have a fixed vertical height at a same as a height of the return port. The lift may be configured to, upon the rental operation, move the loaded auxiliary batteries such that the one end of the loaded auxiliary battery is positioned with the same height as a height of the rental carrier, and upon the return operation, move up and down the loaded auxiliary batteries such that the opposite end of the loaded auxiliary battery is positioned with the same height as a height of the return carrier.

In addition, the battery queue may include a queue frame configured to limit a loading space of the auxiliary batteries, and a support member provided at a lower end of the queue frame to hold up and support an auxiliary battery loaded at a bottom of the queue frame, wherein the support member may selectively implement a state of supporting the auxiliary battery loaded at the bottom and a state of releasing the supporting, and the lift may be disposed below the support member.

In addition, the auxiliary battery, when viewed from a front of the auxiliary battery rental device, may be provided in at least a rear side surface thereof with a pair of charging terminals for charging. The charging unit may be provided with a plurality of pairs of charging pins to come into contact with the pair of charging terminals, respectively, at a rear side of the battery queue (the rental queue and/or the return queue), so that the batteries loaded in the battery queue may be chargeable in a contact mode.

In this case, the charging unit may be configured to allow the plurality of pairs of charging pins to be spaced apart from the charging terminals of the auxiliary battery during operation of the lift.

In addition, the auxiliary battery according to another aspect of the invention may include: a case; a battery cell accommodated inside the case; and a connector electrically connected to the battery cell and connectable to a power connector of the electronic device, wherein the connector is configured to be seated in a seating groove formed at one side of the case so as to be elastically ejected, and the connector is configured to allow a connector pin connected to the power connector of the electronic device to be directed to an inside of the case. Accordingly, when the connector is seated in the seating groove, the connector pin is prevented from being exposed to an outside of the case.

The auxiliary battery may further include an auxiliary connector disposed at the other side of the case and having a specification the same as or different from that of the connector.

In this case, the auxiliary connector may be configured to be seated in an auxiliary seating groove formed at the other side of the case so as to be elastically ejected, and configured to allow a connector pin connected to the power connector of the electronic device to be directed to an inside of the case. Accordingly, when the auxiliary connector is seated in the auxiliary seating groove, the connector pin may be prevented from being exposed to an outside of the case.

In addition, a pair of charging terminals for charging may be provided at one side of the case of the auxiliary battery.

In this case, a pair of charging terminals symmetrically different from the pair of charging terminals may be further formed on the other side opposite to the one side of the case.

Advantageous Effects of the Invention

According to the auxiliary battery rental device of the present invention, lending, returning, charging, and lending auxiliary batteries can be circularly and automatically performed. Accordingly, the administrative burden of the rental device can be remarkably reduced and the utilization efficiency of the device can be maximized.

In addition, according to the auxiliary battery rental device of the present invention, the auxiliary battery is prevented from falling when the auxiliary battery is rented and returned, so that the auxiliary battery can be prevented from being damaged upon rental or return.

In addition, the auxiliary battery according to the present invention has a connector cable integrated with a battery body, so that additional rent and return of a connector cable is unnecessary when the auxiliary battery is rented and returned.

In addition, according to the auxiliary battery of the present invention, the auxiliary battery can be automatically charged by the rental device, so that the auxiliary battery can be suitably used for a device that cyclically lend, receive, charge, and lend auxiliary batteries.

DESCRIPTION OF THE DRAWINGS

The drawings accompanying in the present specification are merely illustrate preferred embodiments according to the present invention, and serve to further understand the technical idea of the present invention together with the detailed description of the invention to be described later, so the present invention should not be construed to limit the matters described in the drawings.

BEST MODE

Figure 1:
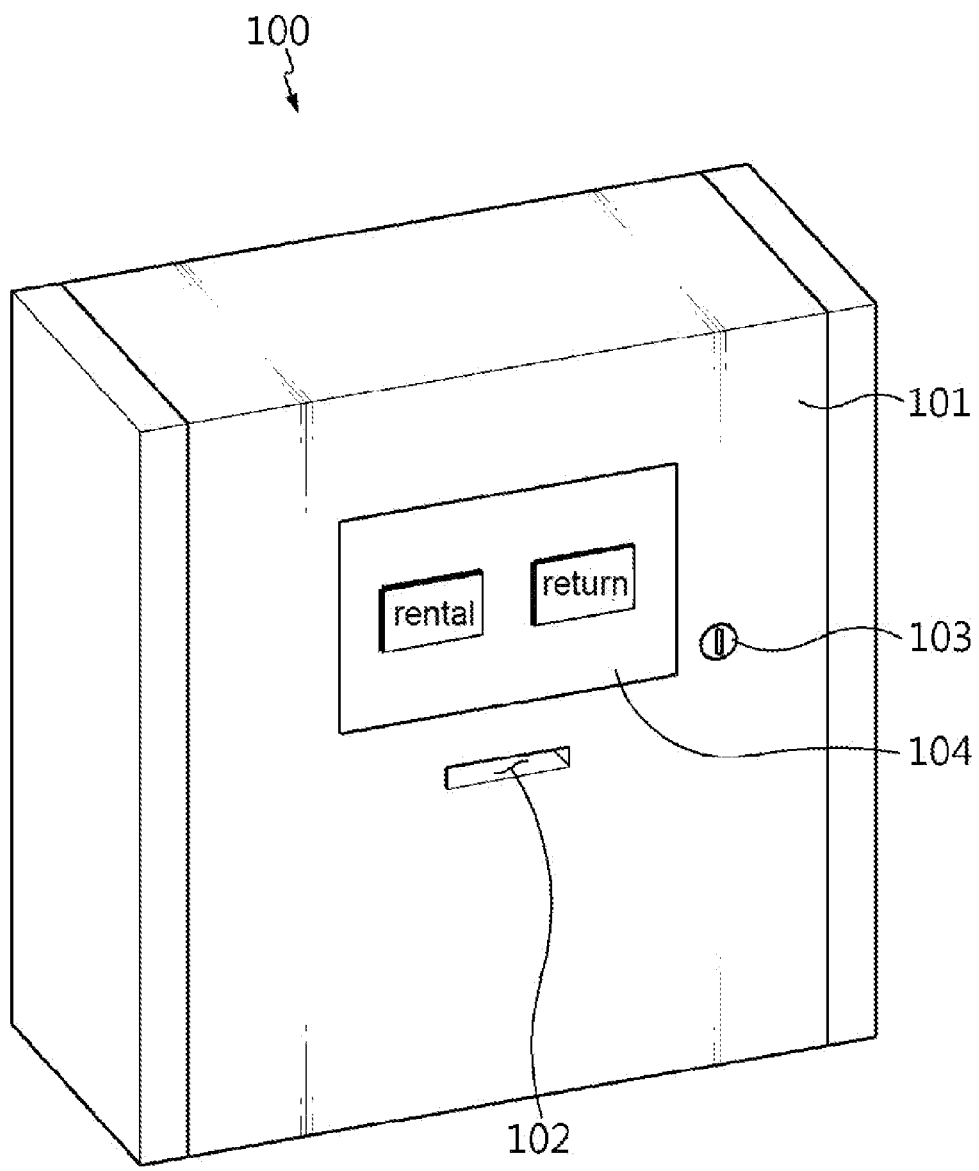
FIG. 1 is a perspective view illustrating an external appearance of an auxiliary battery rental device (hereinafter, simply referred to as "a rental device") according to one embodiment of the present invention.

Hereinafter, an auxiliary battery rental device according to exemplary embodiments of the present invention will be described in detail with reference to the accompanying drawings. Above all, the terms and words used in the specification and claims of the present invention should not be construed as limited to a conventional or lexical meaning, and should be construed as the meanings and concepts consistent with the technical idea of the present invention, based on the principle that "an inventor may define the concept of the term properly in order to describe the invention in the best way".

In addition, the directions such as up, down, left, right, front, and rear and the terms indicating the same are shown and used for convenience of description depictions of the drawings and the following description. Accordingly, the direction may be changed depending on observing or implementing directions of the present invention.

Meanwhile, in the drawings and the following description, reference numerals are basically assigned as numbers, but English alphabets (such as A, B, L, or R) may be added after the numbers. This is because elements are required to be illustrated or described by adding the English alphabet when it is necessary to separately describe the elements although the same numbers with English alphabets basically represent the same or corresponding elements. However, when the separate description is unnecessary, the elements are illustrated or described without adding English alphabets. In this case, the element without English alphabets includes all the elements added by English alphabets.

Figure 2:
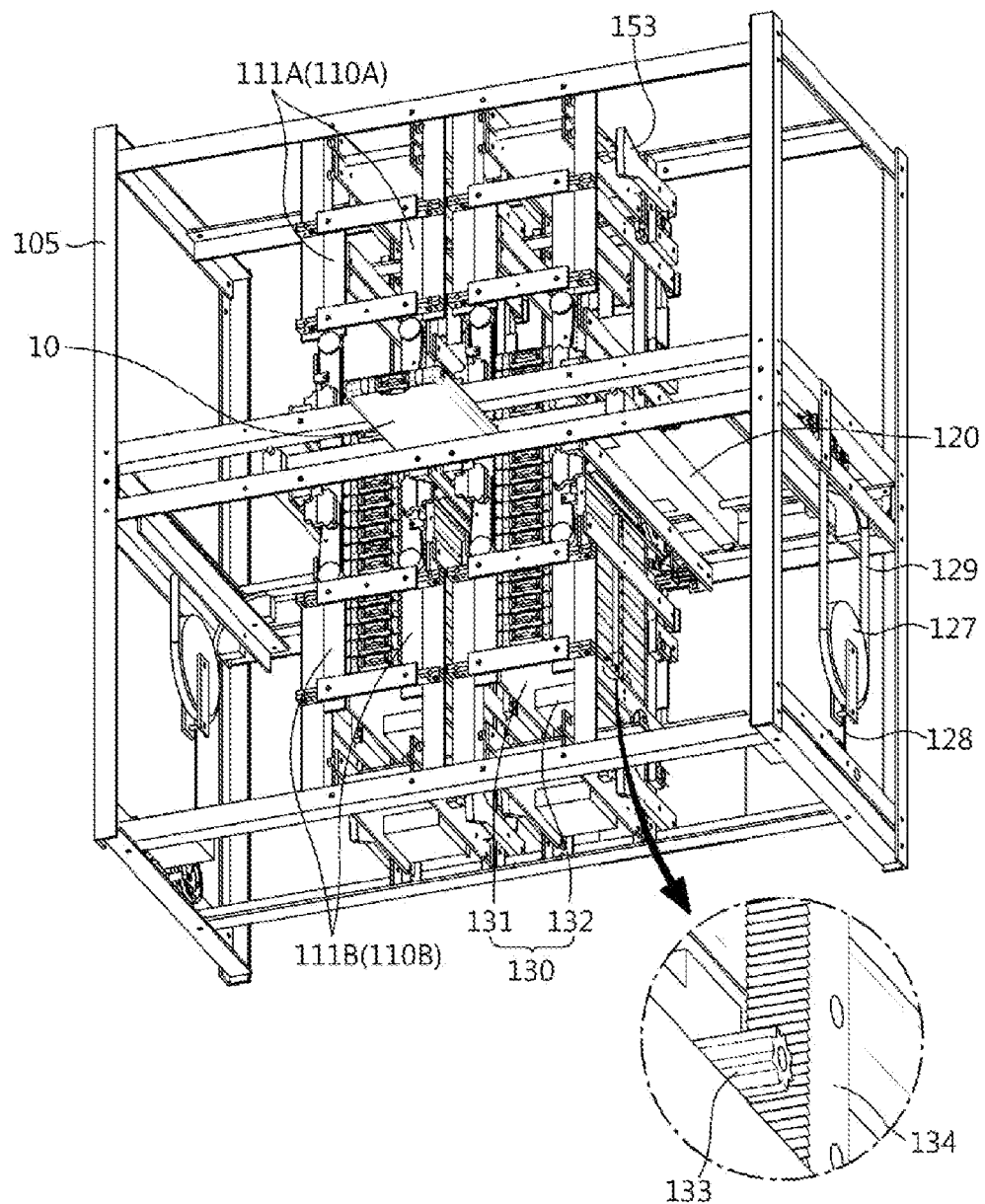
FIG. 2 is a perspective view from a front lower side of the rental device after omitting a housing of the rental device according to an embodiment of the present invention.
Figure 3:
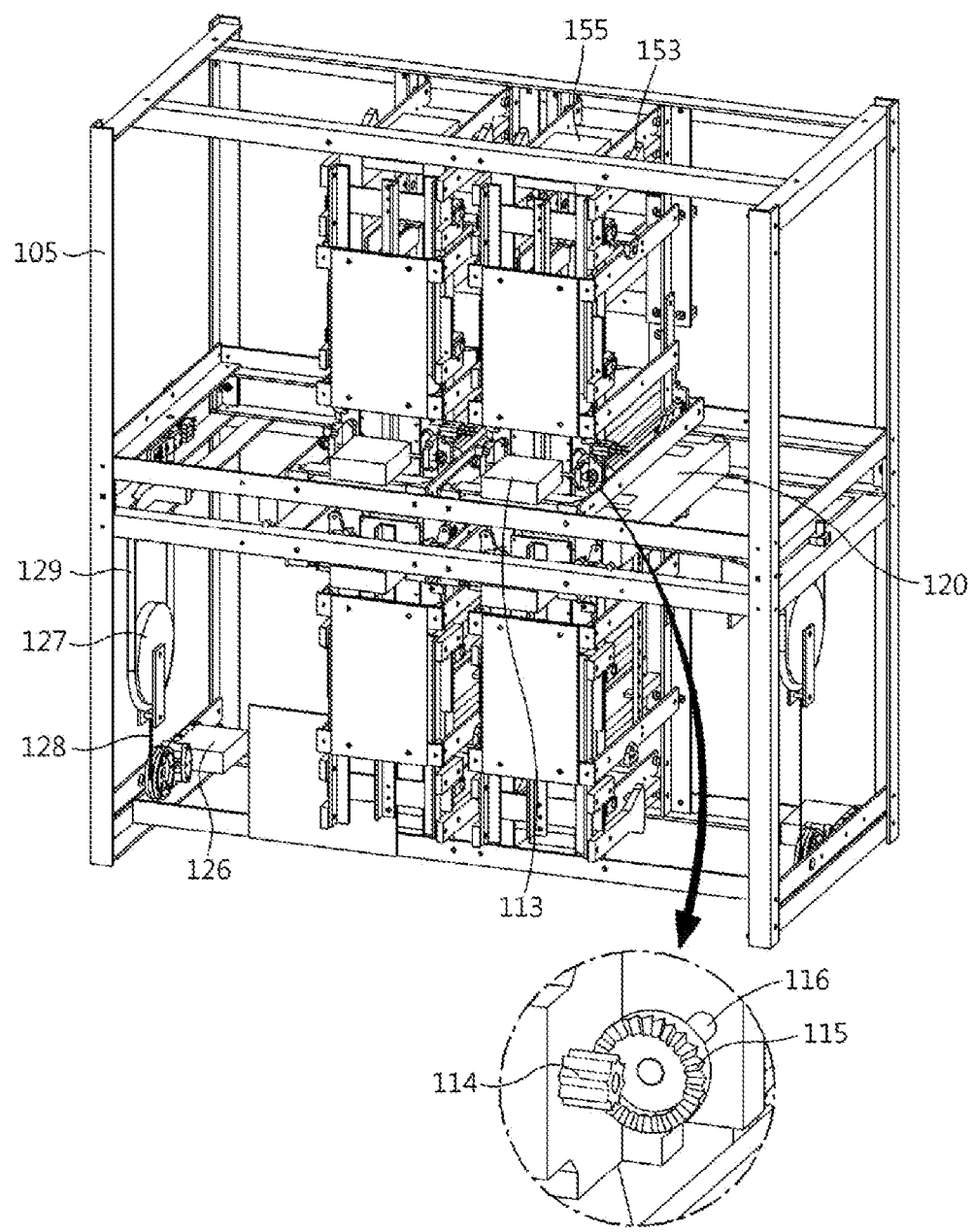
FIG. 3 is a perspective view from a rear upper side of the rental device after omitting the housing of the rental device according to one embodiment of the present invention.

FIG. 1 is a perspective view illustrating an external appearance of an auxiliary battery rental device according to one embodiment of the present invention. FIGS. 2 and 3 are perspective views from front and rear sides of the rental device after omitting a housing of the rental device, respectively.

Referring to FIG. 1, a rental device 100 according to an embodiment of the present invention is a device installed in a public place to lend and receive an auxiliary battery (hereinafter, simply referred to as "battery"). The rental device of the embodiment includes a housing 101 installed therein with components. The housing 101 is formed with a battery port 102 serving as an outlet for a rental battery and an inlet for returning a used battery, and is provided at a suitable height thereof with an operation panel 104 formed of a touch screen or the like. In addition, the housing 101 is formed with a coin or bill insertion hole 103, and although not shown, may be formed with a coin return port. A door or housing fastening/separating structure that is opened and closed using a lock-key may be provided for maintenance and repair.

Figure 13:
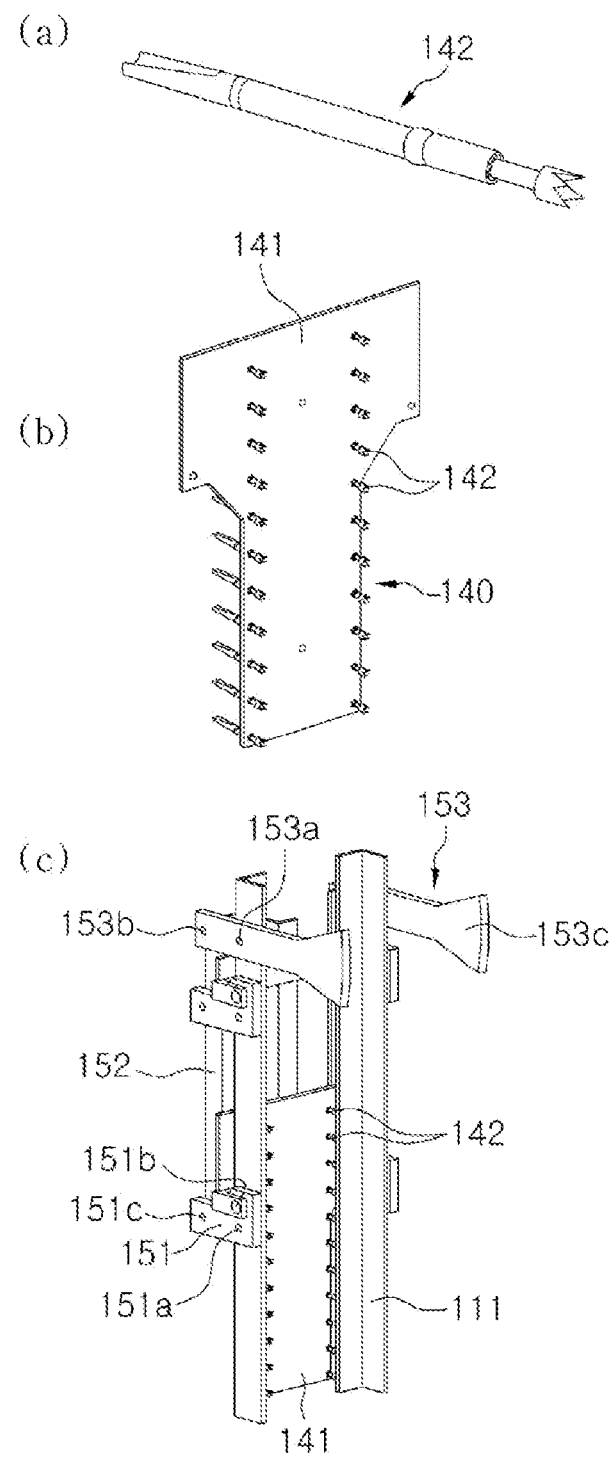
FIG. 13 is a perspective view illustrating a structure of a charging unit of the rental device according to an embodiment of the present invention.

Referring to FIGS. 2 and 3, the rental device 100 according to an embodiment of the present invention mainly includes: a frame 105 on which components constituting the rental device are installed; a battery queue 110 on which batteries 10 are vertically stacked and loaded; a carrier 120 configured to eject and discharge the batteries 10 from the battery queue 110 when the battery is rented, or load returned batteries 10 to the battery queue 110; a lift 130 configured to move up and down the batteries 10 loaded in the battery queue 110 when the batteries are rented or returned; a charging unit 140 configured to charge the batteries 10 loaded in the battery queue 110 (see FIG. 13); and a control unit (not shown) configured to control operations of the elements and provide an interface with a user.

The auxiliary battery 10 rented from and returned to the rental device according to an embodiment of the present invention has a certain specification (such as size, capacity, or connector structure), and although not particularly limited, may have an approximately rectangular parallelepiped shape that may be stacked and loaded in a thickness direction (vertical direction) of the battery queue 110. Meanwhile, the auxiliary battery used in the present embodiment has a structure that may be particularly suitable for the rental device according to an embodiment of the present invention, and will be described later in detail.

In the embodiment, the battery queue 110 includes a pair of a rental queue 110A that loads the batteries 10 for rental and discharge the batteries one by one according to a rental request of the user, and a return queue 110B that receive and load return batteries one by one. The rental queue 110A and the return queue 110B are disposed to vertically face each other while a carrier 120 is interposed therebetween. In other words, in the embodiment, the rental queue 110A is disposed above the carrier 120, and the return queue 110B is disposed below the carrier 120. However, the upper or lower position of the rental queue 110A and the return queue 110B may be changed.

Meanwhile, FIGS. 2 and 3 shows that two pairs of the rental queue 110A and the return queue 110B are disposed in left and right directions. Batteries loaded in the left pair and the right pair may have the same specification, or the batteries having different specifications may be loaded (for example, batteries for Android-based smart phones on the left pair, and batteries for iPhone on the right pair). Of course, the present invention, as shown in FIGS. 2 and 3, is not limited to the two pairs of battery queues, and three pairs or more may be provided or only one pair may be provided.

The battery queue 110 may be implemented as a queue frame 111 that defines a space in which the batteries 10 are mounted to be movable up and down. In addition, the battery queue 110 has a support member for supporting a battery 10 loaded at the bottom thereof.

Figure 4:
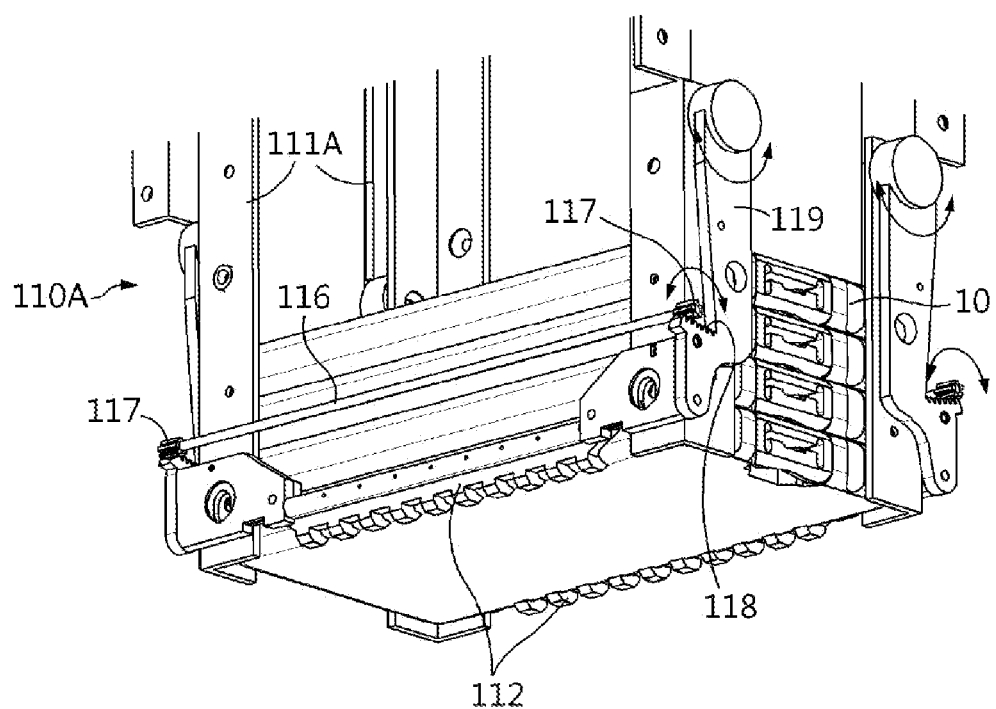
FIG. 4 is a perspective view illustrating a part of a lower end of a battery queue and a battery support member provided in the lower end of the battery queue in the rental device according to one embodiment of the present invention.

Specifically, the rental queue 110A, as shown in FIG. 4, has a claw-shaped support member 112 disposed at a lower end of the queue frame 111A to support the batteries by embracing both edges of a bottom surface of the battery 10 loaded at the bottom. The support member 112 of the rental queue 110A may implement a state in which the support member is closed in the left and right directions to support the battery 10 (the state of FIG. 4), by a driving mechanism such as a motor 113 (see FIG. 3), a power transmission mechanism 114, 115, 116, 117, and 118 including a gear or the like, and a rotating arm 119, when viewed from the front side, and a state in which the support member is opened in the left and right directions to release the support of the battery, and the battery 10 passes through the lower end of the rental queue 110A so as to move up and down. In addition, the support member 112 of the rental queue 110A, when viewed from the front side, has a sharp wedge-shape toward the battery 10 to slightly lift the battery 10 by the thickness thereof when the support member 112 is closed after opened in the left and right directions. Hereinafter, the support member 112 of the rental queue 110A is called a queue nail, and detailed operations will be described later.

Meanwhile, as shown in FIG. 2, the return queue 110B has a plate-shaped support member 131. The plate-shaped support member 131 has a structure that always supports the bottom loaded battery, unlike the queue nail 112 of the rental queue 110A that may implement a support state and a release state of the battery. Meanwhile, the support member 131 of the return queue 110B constitutes a part of the lift 130 to be described later.

Figure 5:
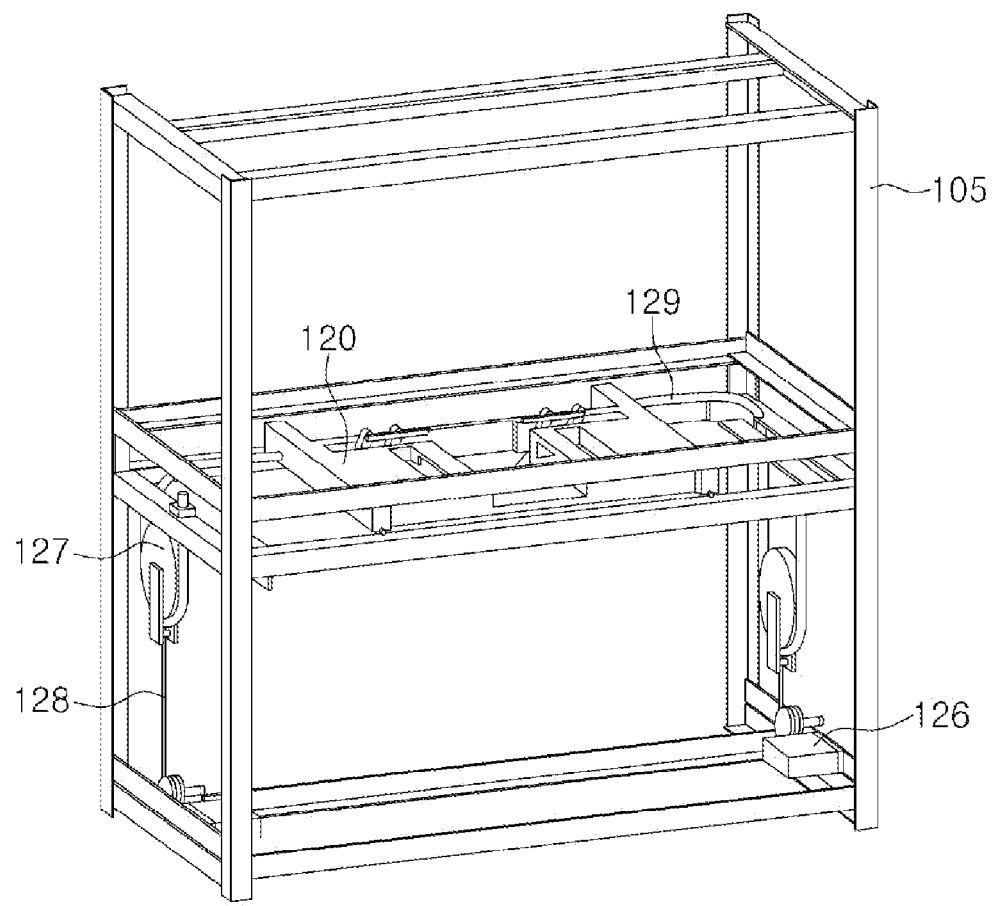
FIG. 5 is a perspective view excerpting and illustrating only a frame, a carrier, and a carrier sliding mechanism in the rental device according to one embodiment of the present invention.
Figure 6:
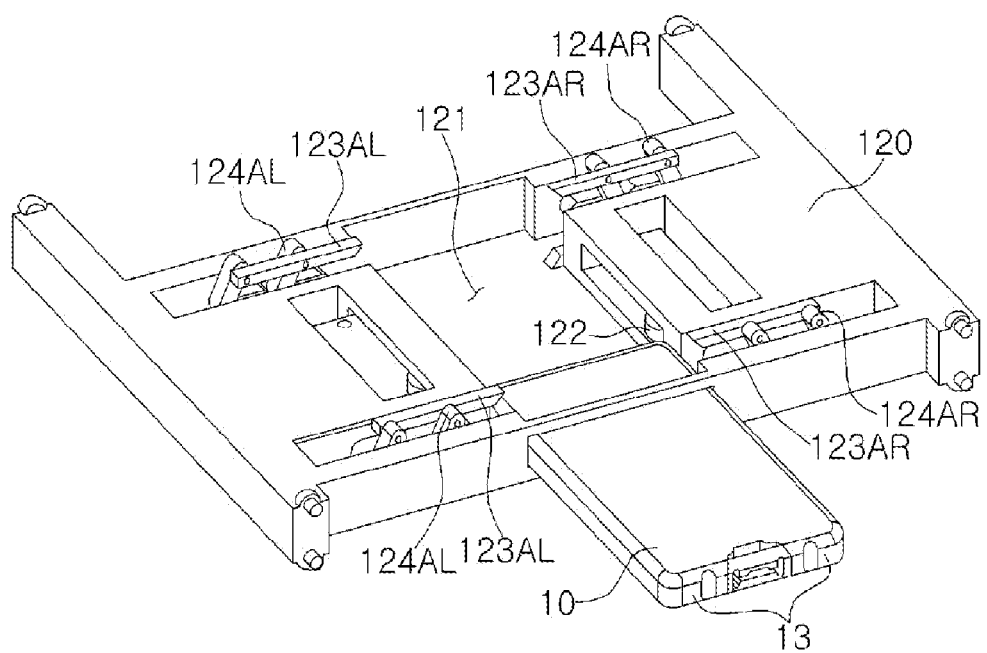
FIG. 6 is a perspective view illustrating the carrier illustrated in FIG. 5 and an auxiliary battery.

FIG. 5 is a perspective view excerpting and illustrating only a frame 105, a carrier 120, and a carrier sliding mechanism in the rental device according to the present embodiment. FIG. 6 is a perspective illustrating the carrier 120. The carrier 120 and the sliding mechanism thereof will be described with reference to FIGS. 5 and 6.

The carrier 120 is a component configured to eject the battery 10 from the rental queue 110A and discharge the ejected battery to the battery port 102 (see FIG. 1), or receive the battery 10 returned through the battery port 102 and load the battery on the return queue 110B. In this embodiment, the carrier 120 has a fixed vertical height equal to a height of the battery port 102, and is installed to be slid in the left and right directions.

As shown in FIG. 6, the carrier 120 is formed at a center thereof with a storage space 121 in which the battery 10 is gripped and stored or through which the battery vertically passes. In addition, a driving mechanism is provided at left and right sides of the storage space 121 to grip the battery 10 or allow the battery 10 to be discharged toward and introduce from a front of the rental device.

Specifically, the driving mechanism includes a roller 122 provided on both side walls of the storage space 121 and a motor (not shown) for rotating the roller to discharge the battery 10 to the battery port 102, or to receive the battery 10, which is returned to the battery port 102, into the storage space 121 when the storage space 121 is aligned with the battery port 102 (see FIG. 1). The motor may rotate forward and backward to enable both discharging (rental) and introducing (return) of the battery, and the direction of rotation may be determined according to the user input on the operation panel 104 (see FIG. 1), or by a sensor (not shown) provided near the storage space 121 by detecting whether the battery is discharged or introduced.

In the embodiment, although the roller 122 has been described as a driving mechanism for discharging and introducing the battery 10, the embodiment may be implemented by a scheme other than the rollers, for example, by a push rod that pushes the battery 10 forward from a rear of the storage space 121. In this case, the introducing (the return) of the battery 10 may be implemented by allowing a user to push the battery manually.

Figure 7:
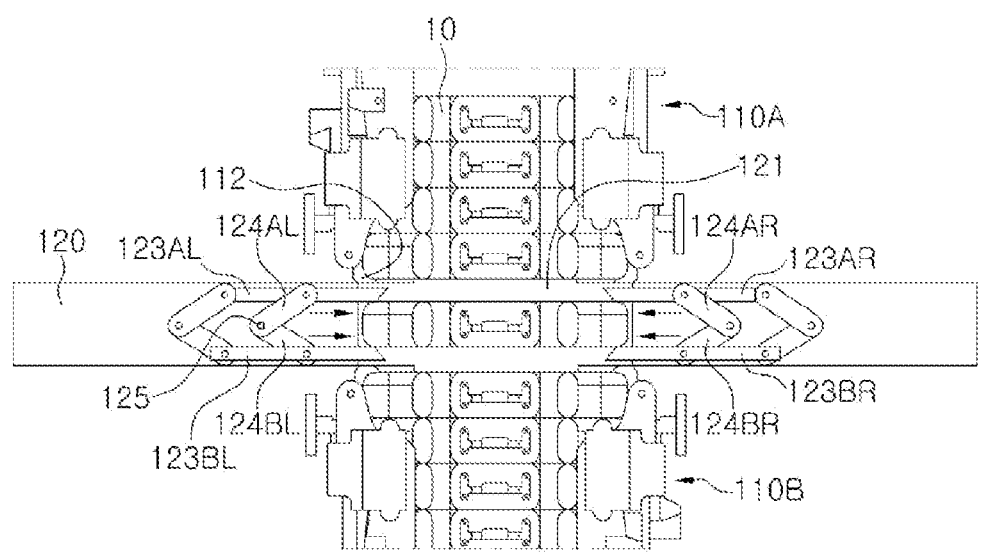
FIGS. 7 to 12 are front views illustrating operations of the carrier and the battery support member in the rental device according to one embodiment of the present invention.

The driving mechanism includes a gripping member for gripping the battery. As shown in FIG. 6, the gripping member includes four carrier nails 123 capable of moving back and forth with respect to the storage space near four corners of the storage space 121, links 124, and a motor (not shown). Left two of the four carrier nails 123 operate same with each other, right two operate same with each other in which the left carrier nails operate symmetrically with the right carrier nails. More specifically, each of the carrier nails 123, as shown in FIG. 7, includes a pair of upper carrier nails 123AL and 123AR and lower carrier nails 123BL and 123BR, and is connected to a rotating shaft 125, which is connected to the motor, through upper links 124AL and 124AR and lower links 124BL and 124BR, respectively. The upper and lower carrier nails 123A and 123B move forward and backward toward the battery present in the storage space 121 by rotation of the motor via the links 124A and 124B therebetween, so that the battery can be gripped and released. In addition, although the upper carrier nail 123A and the upper link 124A may be configured to interwork with the lower carrier nail 123B and the lower link 124B, the upper carrier nail 123A and the upper link 124A may be configured to operate independently of each other. This is because the carrier nail 123 is allowed not only to function to grip the battery 10 but also to move up and down the battery 10 by about one space unit upward or downward from the storage space 121 in cooperation with the above-described queue nail 112 (detailed operations will be described later).

The sliding mechanism for sliding the carrier 120 in the left and right directions, as shown in FIG. 5, includes: motors 126 provided on both lower sides of the frame 105; a wire 128 wound or released in accordance with rotation of the motor to pull a movable pulley 127; the movable pulley 127 pulled by the wire 128 to move up and down; and a sliding wire 129 having one end fixed to the frame 105 and the other end wound around the movable pulley 127 by a half turn and then connected to the carrier 120. Accordingly, in order to slide the carrier 120 in a right direction for example, the motor 126 on the right side is rotated to wind the wire 128 on the right side and lower the movable pulley 127 on the right side, so that the sliding wire 129 on the right pulls the carrier 120 in the right direction. At this time, with regard to the wire 128 on the left side, the movable pulley 127 on the left side, and the sliding wire 129 on the left side, the wire 128 is naturally released according to an operation of the sliding mechanism on the right side, the movable pulley 127 moves up, and the sliding wire 129 moves in the right direction. Alternatively, the motor 126 on the left side is simultaneously rotated, if necessary, so that the sliding mechanism on the left side may operate in conjunction with the sliding mechanism on the right side.

Meanwhile, the carrier sliding mechanism in the rental device of the present embodiment may be implemented in other way such as caterpillar-type chain, belt, or wire, and may be implemented by a linear motor or a hydraulic/pneumatic cylinder. In addition, in the above embodiment, the sliding wire 129 may be implemented as a chain or belt instead of the wire.

Further, since the rental device of the embodiment employs the plurality of pairs of rental queues 110A and return queues 110B and is configured to have only one battery port 102, the carrier 120 for moving the battery between the battery queue 110 and the battery port 102 is required to have a slid structure in the left and right directions. However, when only one pair of rental queue 110A and return queue 110B is employed, the battery port 102 may be formed between the rental queue 110A and the return queue 110B, and the carrier 120 may be fixedly disposed at a position where the storage space 121 is aligned with the battery port 102. Accordingly, the sliding mechanism for sliding the carrier 120 in the left and right directions is unnecessary.

Then, operational examples of the queue nail 112 and the carrier nail 123 will be described with reference to FIGS. 7 to 12 that are front views illustrating operations of the carrier and the battery support member.

The operational examples illustrated in FIGS. 7 to 12 shows operations in which the battery 10 located in the storage space 121 of the carrier is raised by one space and loaded at a bottom of the rental queue 110A above the carrier 120, with interwork (cooperation) between the queue nail 112 and the carrier nail 123. First, the carrier 120 is slid in the left and right directions, so that the storage space 121 of the carrier is positioned between the rental queue 110A and the return queue 110B. Then, the batteries loaded in the return queue 110B are raised by the lift 130 described later such that the battery 10 loaded on the top of the return queue 110B enters the storage space 121 of the carrier. At this time, the carrier nails 123 are in a state of being retracted from the storage space 121, and the queue nails 112 of the rental queue 110A are in a state of being closed and supporting the batteries 10 loaded on the rental queue 110A.

In the above state, as shown in FIG. 7, the carrier nails 123 move toward the battery 10 located in the storage space 121 (see arrows), so that the battery is slightly raised by the thickness of the carrier nail 123 while holding both sides of the battery 10.

Figure 8:
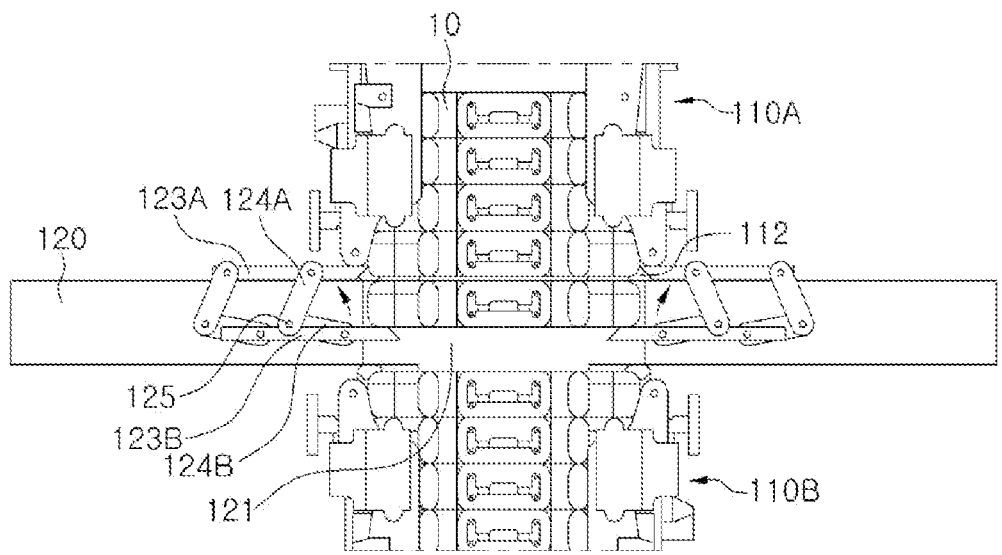

Then, as shown in FIG. 8, the upper links 124A and the lower links 124B are rotated in the same direction about the rotating shaft 125 (see arrows), so that the battery gripped by the carrier nails 123 is raised to approach the battery 10 loaded at the bottom of the rental queue 110A. At this time, the queue nails 112 of the rental queue 110A are still closed, in which a gap equal to the thickness of the queue nail 112 exists between the battery 10 lifted by the carrier nails 123 and the battery 10 loaded at the bottom of the rental queue 110A. Meanwhile, as shown in FIGS. 4 and 6, since positions of the queue nail 112 and the carrier nail 123 for gripping the battery 10 do not overlap each other, the grips do not interfere with each other.

Figure 9:
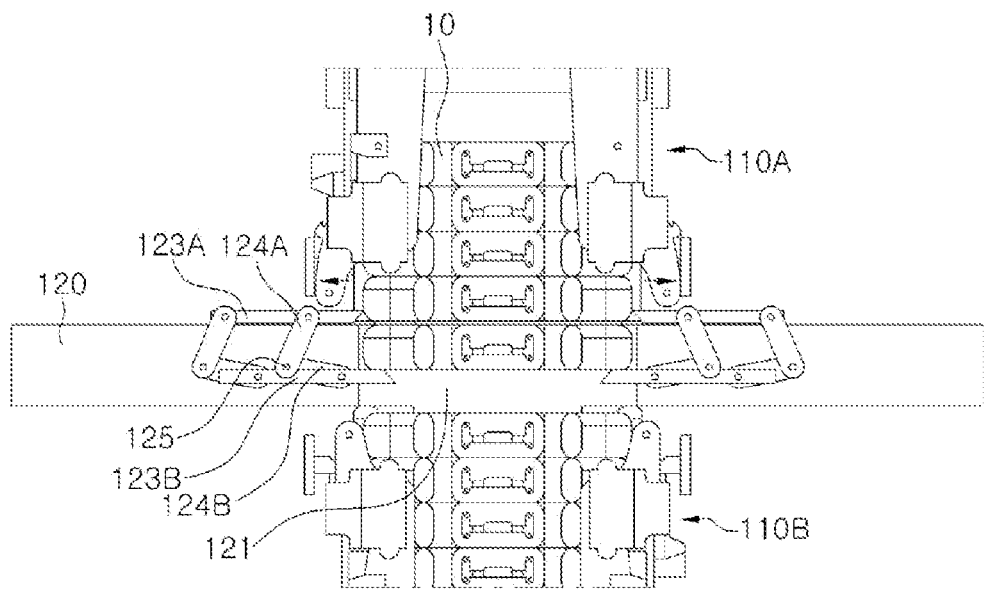
Figure 10:
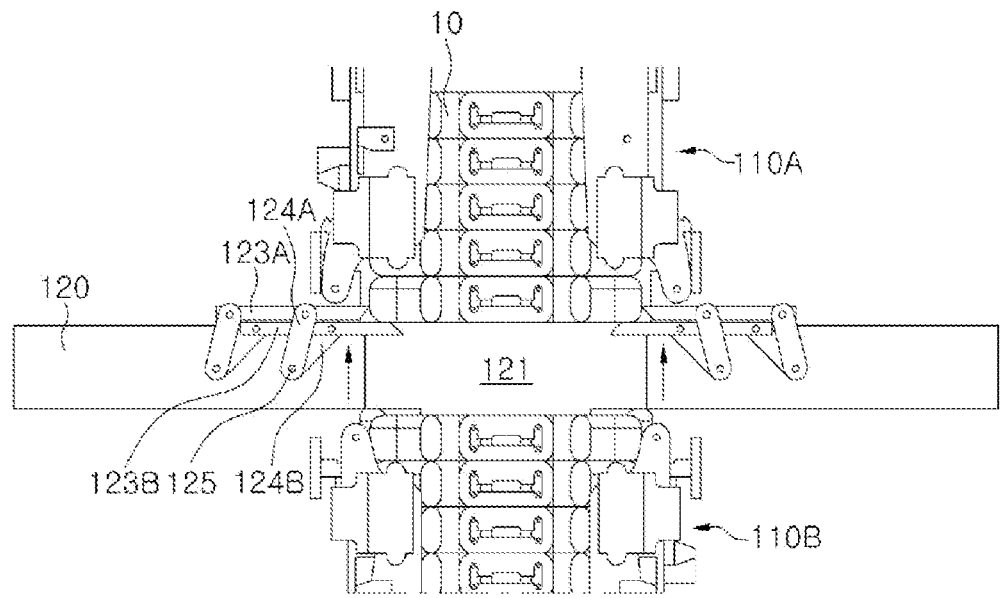

Then, when the queue nails 112 are opened as shown in FIG. 9 (see arrows), and the lower carrier nails 123B are further lifted as shown in FIG. 10 (see arrows), the battery 10 gripped by the carrier nails 123 is further lifted together with the batteries 10 already loaded in the rental queue 110A, thereby entering the rental queue 110A.

Figure 11:
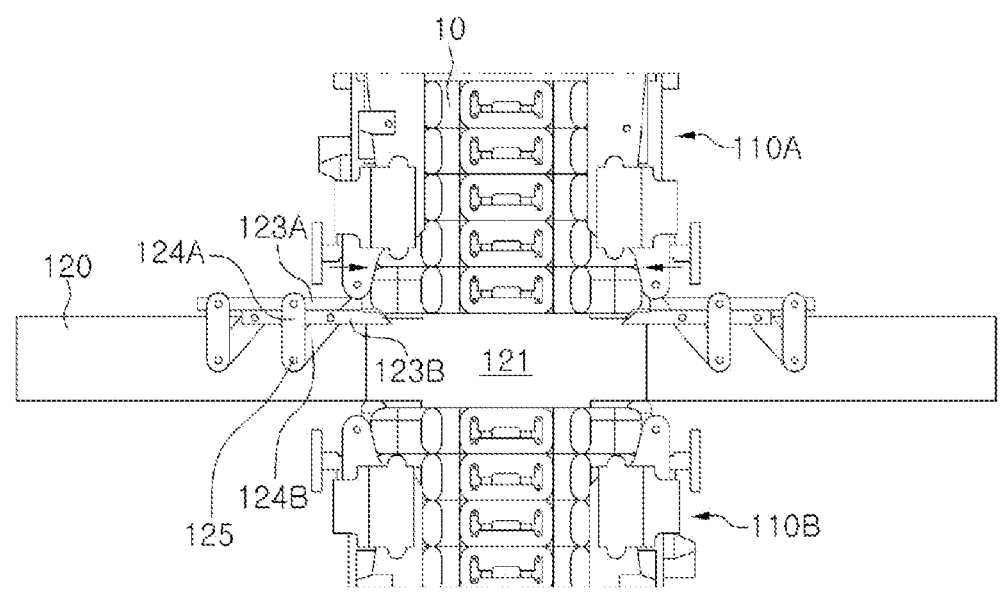

Then, as shown in FIG. 11, the queue nails 112 are closed (see arrows), so that the lifted battery 10 is loaded at the bottom of the rental queue 110A and supported.

Figure 12:
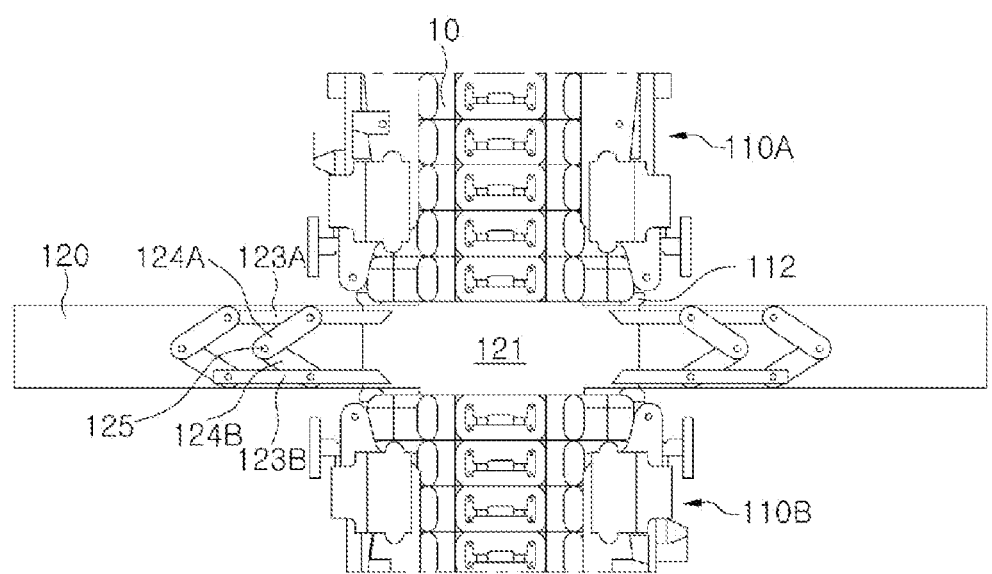

Then, as shown in FIG. 12, the carrier nails 123 are returned to initial positions, and thus the one-stepped lifting movement of the battery is completed.

Thus, according to the present embodiment, not only the gripping operation of the battery but also the lifting operation of the battery may be implemented by the queue nails 112 provided in the battery queue 110 and the carrier nails 123 provided in the carrier 120.

As described above, the auxiliary battery rental device according to the present invention may automatically charge the discharged battery returned after use, and the battery may be provided for rental again. The configuration of the charging unit for implementing the above will be described with reference to FIGS. 13 to 15.

In the embodiment, the charging unit is disposed at a rear side of the return queue 110B and the rental queue 110A. Since the batteries loaded in the return queue 110B are the batteries required to be charged, it may be sufficient to provide the charging unit only to the return queue 110B. However, in some cases (for example, in the case that the return queue is full and the return is impossible), even the battery without being completely charged needs to be moved to an empty rental queue 110A. In order to continuously charge the battery after moved to the rental queue, the charging unit also may be provided in the rental queue 110A.

As shown in FIG. 13(b), the charging unit 140 includes a circuit board 141, and pairs of charging pins 142, in which the pairs of charging pins 142 configured to come into contact with charging terminals 13 (see FIG. 49) of the battery, respectively are provided with as many pairs as the number of batteries that may be loaded in the battery queue 110. In addition, electronic components such as circuit elements electrically connected to the charging pins 142 for charging, and a microprocessor stored therein with a control program for controlling a charging process are mounted in the circuit board 141. The control program may be programmed to allow each of batteries to be individually and independently charged.

The charging pin 142 may be a so-called pogo pin type charging pin as shown in FIG. 13(a), in which a spring is accommodated therein to elastically and stably come into contact with the charging terminal of the battery.

The charging unit 140 configured as the above description, as shown in FIG. 13(c), is mounted to the queue frame 111 located at a rear side of the battery queue 110, in which the charging unit 140 may be mounted to be spaced apart from/accessible to the queue frame 111, and eventually, the charging terminal of the battery. This is because the batteries 10 loaded on the battery queue 110 in the rental device according to an embodiment of the present invention may move up and down by the queue nails 112 and/or the carrier nails 123 as described above, or may move up and down by the lift 130 as described later. At this time, when the charging pin 142 of the charging unit 140 is always in contact with the charging terminal 13 (see FIG. 49) of the battery, the battery may not easily move up and down or the charging pin 142 or the charging terminal 13 may be damaged. Accordingly, the charging unit (the charge pin) may be spaced apart from the battery (the charge terminal) while the battery 10 moving up and down.

To this end, in the present embodiment, the charging unit 140 is mounted to the queue frame 111 via links. Specifically, the charging unit (circuit board; 141) is rotatably connected to one movable joint 151b of a first link 151 having a fixed joint 151a fixed to the queue frame 111 and rotatable and two movable joints 151b and 151c. One end of a second link 152 disposed in parallel with the queue frame 111 is rotatably connected to the movable joint 151c of the first link 151, and the other end of the second link 152 is rotatably connected to a movable joint 153b of a third link 153 disposed in parallel with the first link 151. In addition, the third link 153 is rotatably fixed to the queue frame 111 through a fixed joint 153a, and a movable end 153c opposite to the movable joint 153b of the third link 153 is connected to a motor 155 (see FIG. 3) via a gear or cam mechanism.

Figure 14:
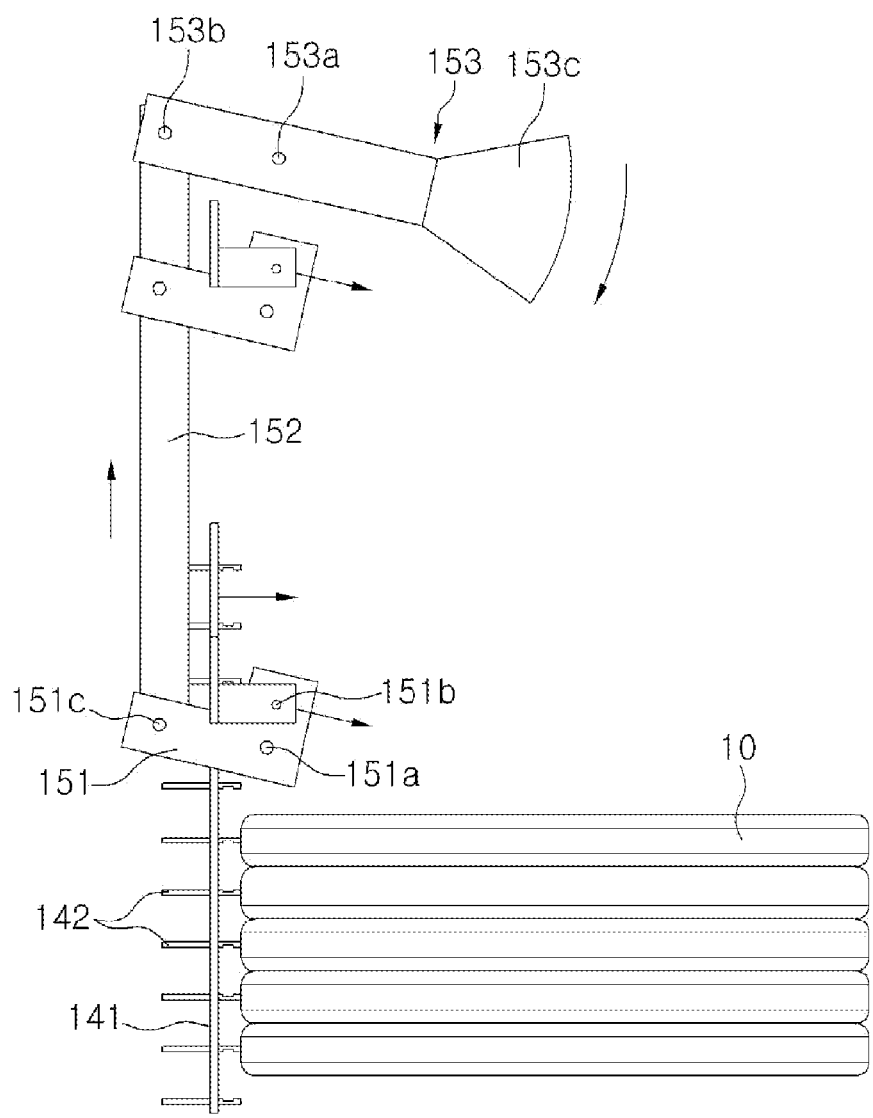
FIGS. 14 and 15 are side views illustrating operations of the charging unit illustrated in FIG. 13.

Accordingly, as shown in FIG. 14, when the motor 155 moves the movable end 153c of the third link 153 downward, the third link 153 is rotated about the fixed joint 153a, and thus the movable joint 153b and the second link 152 connected to the movable joint 153b move upward. Accordingly, since the movable joint 151c of the first link 151 moves upward, and the other movable joint 151b moves rightward and downward in the drawing, the circuit board 141 connected to the movable joint 151b moves rightward, and thus the charging pins 141 press and come into contact with the charging terminals of the battery 10.

Figure 15:
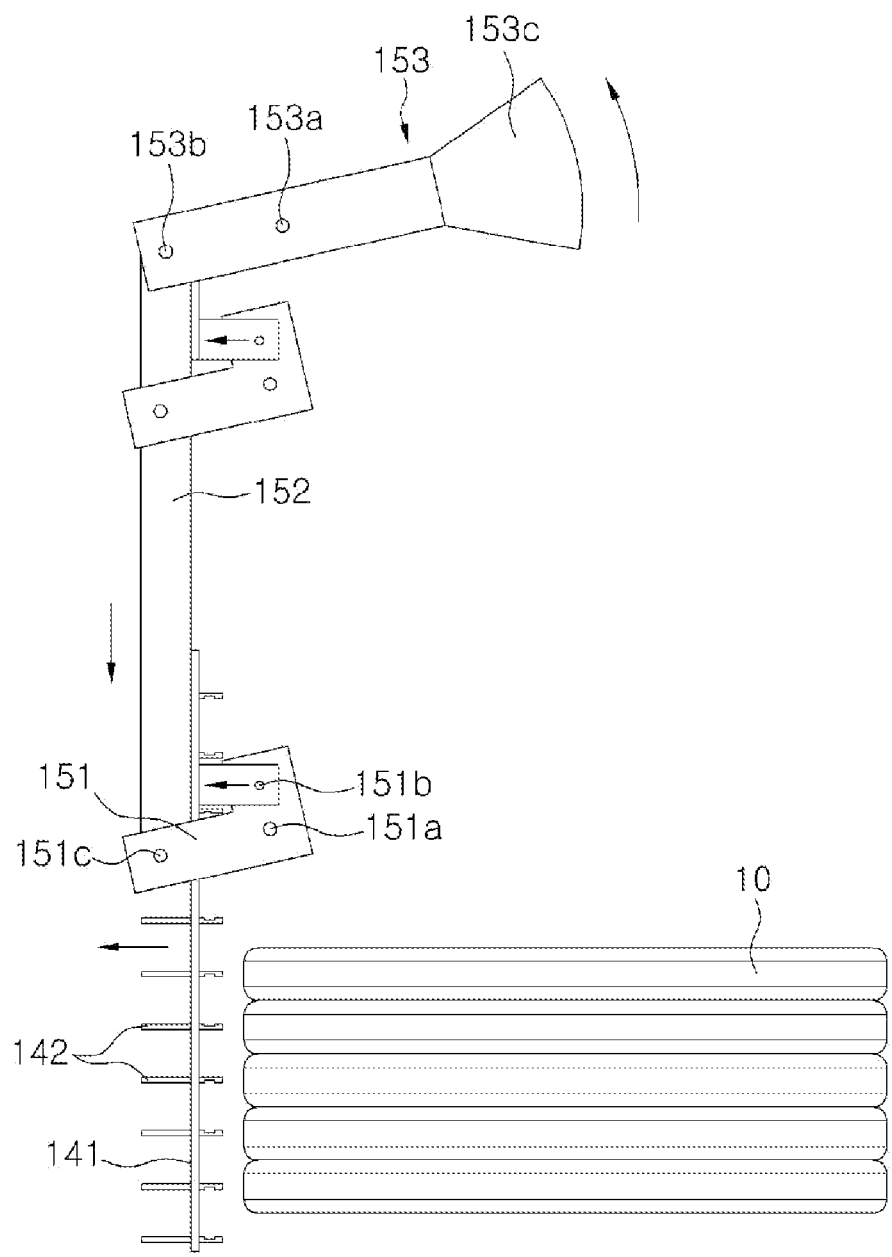

In order to space the charging unit 140 apart from the battery 10, as shown in FIG. 15, the motor 155 moves the movable end 153c of the third link 153 upward, the third link 153 is rotated about the fixed joint 153a, and thus the movable joint 153b and the second link 152 connected to the movable joint 153b move downward. Accordingly, since the movable joint 151c of the first link 151 moves downward, and the other movable joint 151b moves leftward and downward, the circuit board 141 connected to the movable joint 151b moves leftward, and thus the charging pins 142 are spaced apart from the charging terminals of the battery 10.

Meanwhile, the battery is provided with a pair of charging terminals at positions corresponding to the pair of charging pins 141 of the charging unit 140, and this will be described later in detail.

Accordingly, in the rental device according to an embodiment of the present invention, so-called contact-type charging is performed in which charging is carried out by allowing the corresponding charging pins to come into contact with the charging terminals of the battery. However, the present invention is not limited thereto, and a contact-less charging using electromagnetic induction may also be performed.

Then, the configuration and operation of the lift for transferring the battery returned from the return queue 110B to the rental queue 110A available for rental will be described according to the rental device of the present embodiment.

The lift 130 includes the plate-shaped support member 131 described with reference to FIG. 2, and the driving mechanism for moving up and down the battery 10 mounted on the support member 131. In the embodiment, the driving mechanism includes a motor 132 (see FIG. 2) and a gear mechanism, in which the gear mechanism may include a pinion 133 rotated by the motor 132 and a rack 134 disposed vertically along a side surface of the return queue 110B.

Alternatively, the lift may be implemented by a motor and a screw, or may be implemented using a hydraulic or pneumatic cylinder.

When the lift 130 configured as the above description is used, the operation of moving the batteries 10B loaded in the return queue 110B to the rental queue 110A may be performed as follows.

First, the carrier 20 is slid left and right such that the storage space 21 of the carrier 20 is arranged between the rental queue 110A and the return queue 110B. In addition, both the carrier nails 123 and the queue nails 112 are opened. For example, it can be assumed that the rental queue 110A has no loaded batteries in a state shown in FIG. 12, and both the carrier nails 123 and the queue nails 112 are opened. Meanwhile, FIGS. 7 to 12 illustrate that an upper end of the return queue 110B disposed below the carrier 120 is provided with queue nails and a driving mechanism for opening and closing the queue nails. However, the drawings merely reflect that the components of the rental device may be standardized by identically configuring and symmetrically arranging the rental queue 110A and the return queue 110B with each other. The queue nail and the queue nail driving mechanism are not necessarily provided on the top of the return queue 1108.

When the motor 132 of the lift 130 is rotated in one direction, the plate-shaped support member 131 moves up in a state that the carrier 120, rental queue 110A, and the return queue 1108 are aligned as above and both of the carrier nails 123 and the queue nails 112 are opened. The batteries 10 loaded thereon move up through the storage space 121 of the carrier 120 and the opened queue nails 112 of the rental queue 110A, and enter the rental queue 110A. At this time, as described above, the charging unit 140 is spaced apart from the battery toward the rear side of the battery queue 110 at least during operation of the lift 130, so that the battery may move up and down smoothly and the battery may be prevented from being damaged.

When the ascending of the battery is complete, the motor 132 of the lift 130 stops and the queue nails 112 of the rental queue 110A are closed to support the batteries, which are transferred to the rental queue 110A, from below. At this time, the battery at the bottom of the raised batteries may be located below the queue nails 112 of the rental queue 110A, depending on an operating range of the lift 130. At this time, the battery at the bottom may be raised to the rental queue 110A by the operation as described with reference to FIGS. 7 to 12. Alternatively, the above problem may be avoided by configuring the plate-shaped support member 131 such that an upper end surface of the plate-shaped support member 131 is about the same as a height of the queue nails 112 of the rental queue 110A when the plate-shaped support member 131 ascended at the highest.

Meanwhile, the operation of moving the batteries 10 loaded in the return queue 1108 to the rental queue 110A by using the lift 130 is performed when the rental queue 110A is empty, when the return queue 1108 is full, or when the charging of the battery 10 loaded in the return queue is completed. At this time, in some cases, since the rental queue 110A is not completely empty, all of the batteries loaded in the return queue 1108 may not be moved to the rental queue 1108. At this time, the motor 132 of the lift 130 may be controlled to allow the plate-shaped support member 131 to move only up to the extent as possible. Meanwhile, in this case, when the carrier nails 123 and the queue nails 112 of the rental queue 110A are immediately opened to raise the batteries loaded in the return queue 1108, the battery remaining in the rental queue 110A may fall and collide with a battery loaded on the top of the return queue 1108 and be damaged. Accordingly, in this case, only the carrier nails 123 may be opened while closing the queue nails 112 of the rental queue 110A and the lift 130 may be operated. When the battery loaded on the top of the return queue 1108 rises just below the queue nails 112 of the rental queue 110A, the lift 130 stops. Then, the queue nails 112 of rental queue 110A may be opened and the battery remaining in the rental queue 110A may be gently disposed on the battery raised from the return queue 1108, and then the lift 130 may operate again to raise the combined batteries together up to the available height.

According to the rental device of the present embodiment, the discharged and returned batteries can be immediately charged in the device and moved to the rental queue 110A, so that lending, returning, charging, and lending can be circularly and automatically performed. Accordingly, the needs to do additional work of collecting and charging the returned batteries, and replenishing charged batteries for rental are remarkably reduced.

In addition, according to the structure and operation of the carrier 120, the lift 130 and the battery queue 110 described above, a shock when the battery falls or the like may be avoided, so that there is no risk of damage to the battery during rental and return process.

Then, rental operation (FIGS. 16 to 22) of the batteries in the rental device according to an embodiment of the present invention, the return operation (FIGS. 23 to 26), and the moving operation of the batteries from the return queue to the rental queue (FIGS. 27 to 30) will be described with reference to FIGS. 16 to 30.

Meanwhile, the above-described components are omitted or simplified for convenience of description and depiction in FIGS. 16 to 30 and FIGS. 31 to 48 which are views for explaining the operation of the rental device according to another embodiment described later. In other words, only the queue nails 112 are shown as an L-shape in the rental queue 110A, only the carrier nails 123 are also shown as an L shape in the carrier 120, and only the plate-shaped support member 131 is shown in the lift 130.

In addition, in FIGS. 16 to 48, for convenience of understanding and explanation, available and charged batteries are hatched, and batteries to be returned (or having been returned) are considered as discharged and are not hatched.

In addition, although FIGS. 16 to 48 show examples in which four battery queues are arranged laterally, and describe that actual operations are applied only to the leftmost battery queue, the number of battery queues is not limited to the illustrated examples, and the actual operation may be applied to the other battery queues. For example, when the rental or return of the battery is carried out in the rightmost queue according to the battery specification, or when any one return queue is full among a plurality of battery queues having the same specification, the batteries returned may be stacked in another return queue having room of the same specification.

Now, the battery rental operation will be described with reference to FIGS. 16 to 22.

Figure 16:
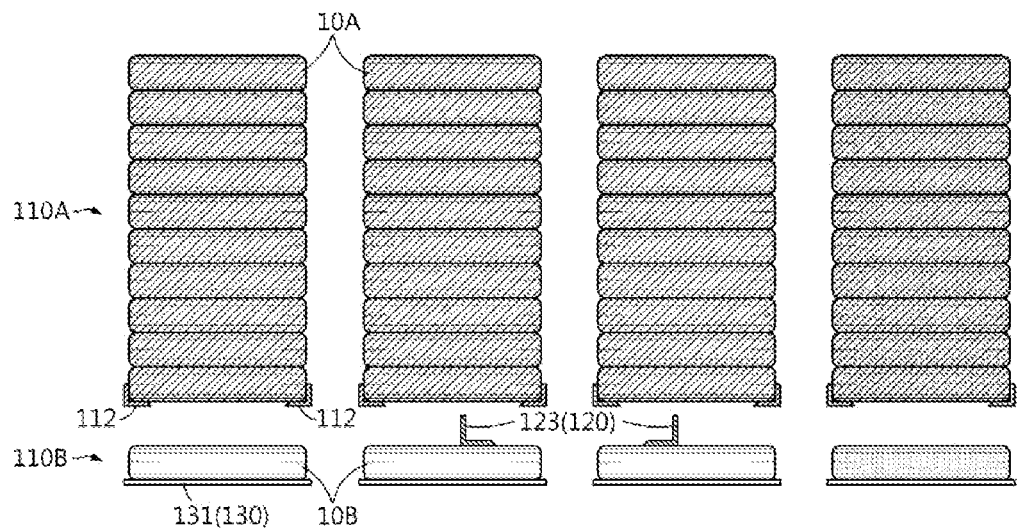
FIGS. 16 to 22 are front views conceptually illustrating operations of an auxiliary battery rental process of the rental device according to one embodiment of the present invention.

FIG. 16 as a standby state shows a state in which each of the four rental queues 110A is loaded with ten charged batteries 10A, and each of the four return queues 110b is loaded with one returned and discharged battery 10B. During the standby, the carrier 120 is positioned in a state where the storage space 121 of the carrier is aligned with the battery port 102 (see FIG. 1), the queue nails 112 of each rental queue 110A supports the loaded batteries 10A while being closed below the battery 10A loaded at the bottom. In addition, the lift 130 (plate-shaped support member 131) is positioned such that the top surface of the battery 10B loaded on the top of the return queue 110B is positioned at the same height as the bottom surface of the carrier 120.

Figure 17:
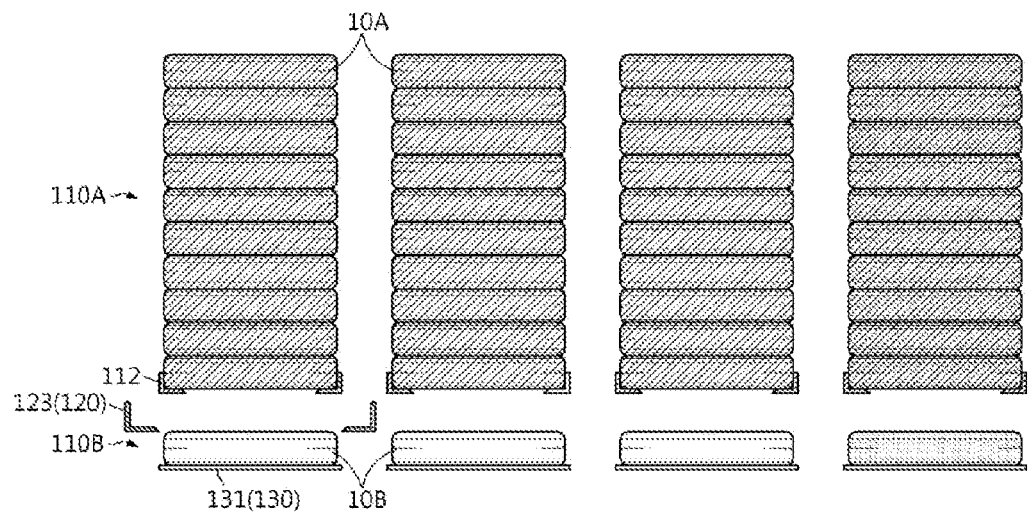

When a rental request is received from the user during the standby state, the carrier 120 moves below the rental queue 110A (hereinafter, described as the leftmost rental queue) on which a battery to be rented of a desired specification is loaded, and opens the carrier nails 123 (FIG. 17).

Figure 18:
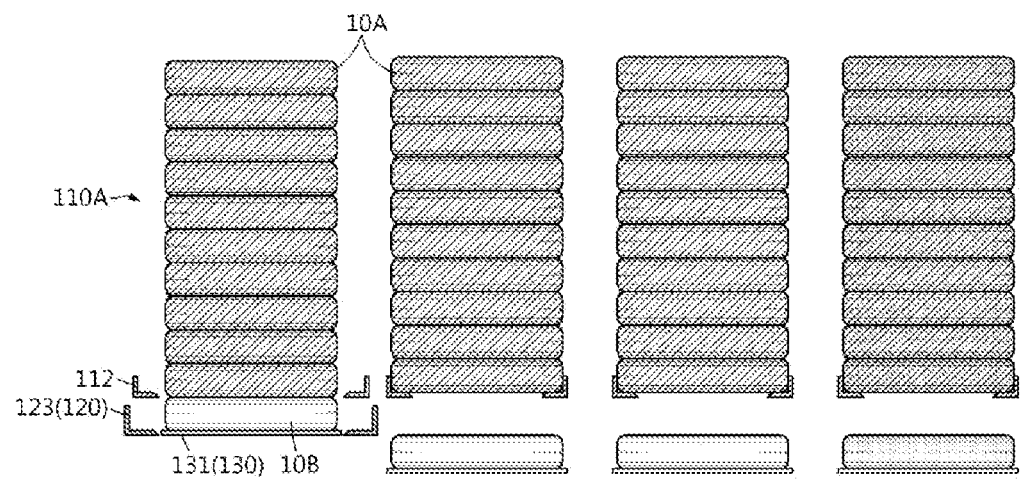

Then, the lift 130 is raised to allow the battery 10B loaded in the return queue 110B to pass through the storage space 121 between the opened carrier nails 123 and to rise below the rental queue 110A. Then, the lift 130 stops and then the queue nails 112 of the rental queue 110A are opened to gently put the batteries 10A loaded in the rental queue 110A onto the raised battery 10B (FIG. 18).

Figure 19:
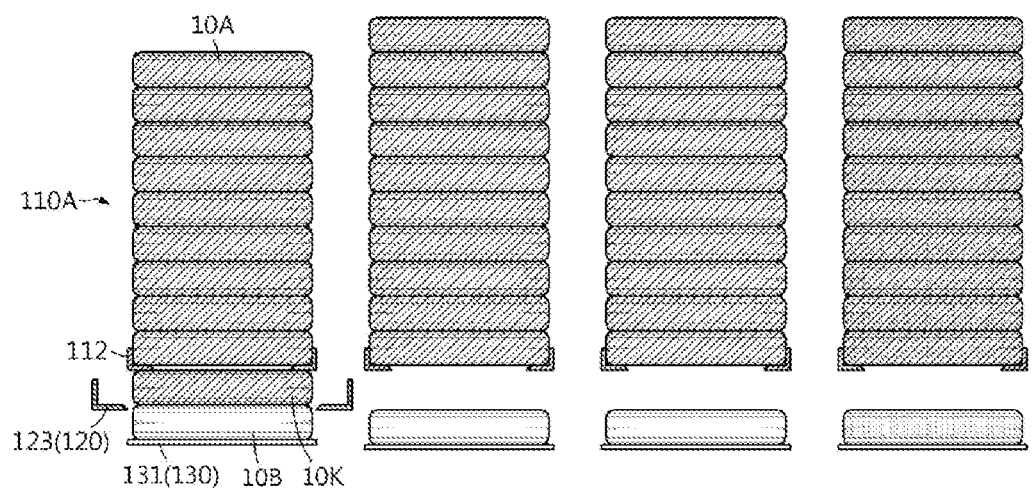
Figure 20:
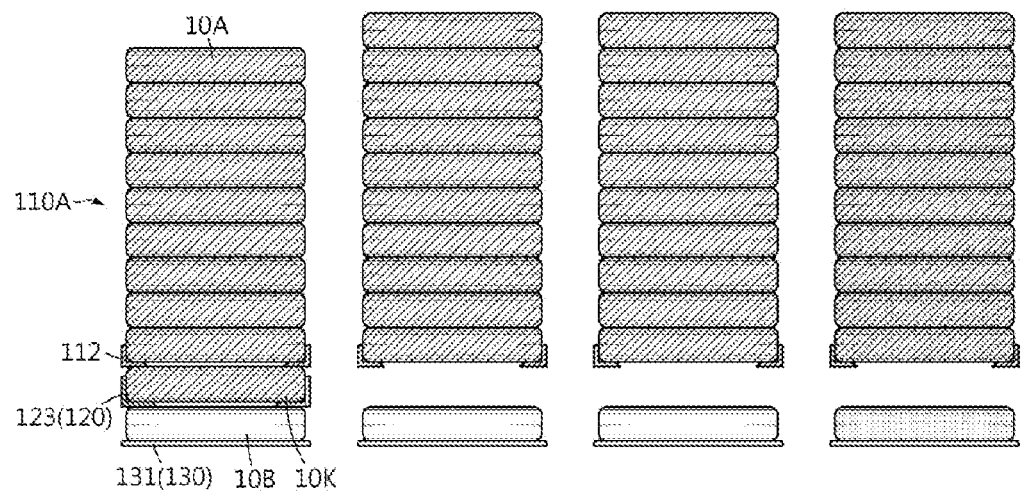
Figure 21:
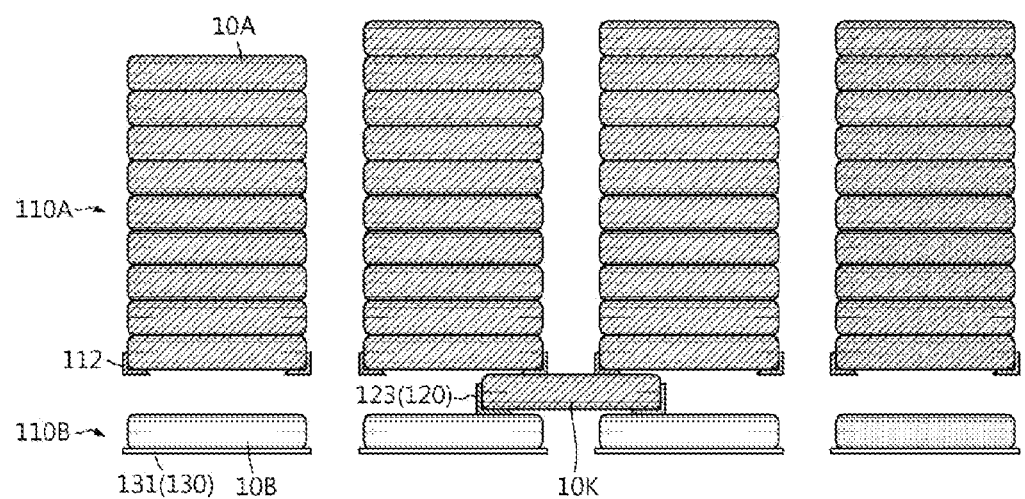

Then, the lift 130 descends to lower the entire batteries 10A and 10B by one space, and the queue nails 112 of the rental queue 110A are closed (FIG. 19). Accordingly, the battery 10K positioned directly below the closed queue nails 112 is disposed in the storage space 121 of the carrier 120. In this state, the carrier nails 123 are closed and the battery 10K disposed in the storage space 121 is gripped as an object to be rented (FIG. 20).

Figure 22:
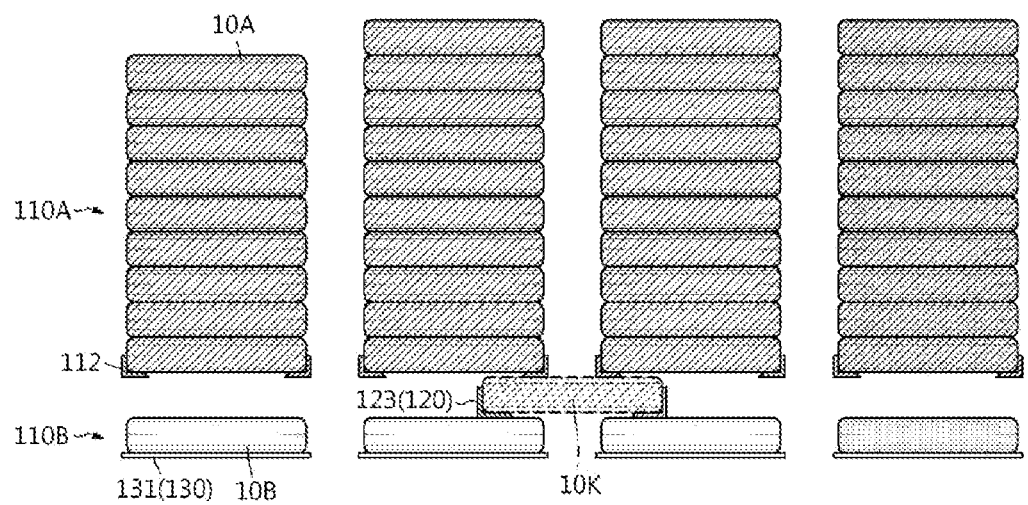

Then, after the carrier 120 is moved such that the storage space 121 is aligned with the battery port 102 (FIG. 21), the roller 122 (see FIG. 6) of the carrier 120 is driven, the battery 10K gripped by the carrier 120 is discharged to the battery port 102, and thus the rental device becomes in a standby state again (FIG. 22) (in FIG. 22, dotted lines for the battery 10K indicate that the battery has been discharged). Accordingly, the rental operation of the battery is completed, in which nine batteries 10A after reducing one are loaded in the leftmost rental queue 110A.

Then, the battery return operation will be described with reference to FIGS. 23 to 26.

Figure 23:
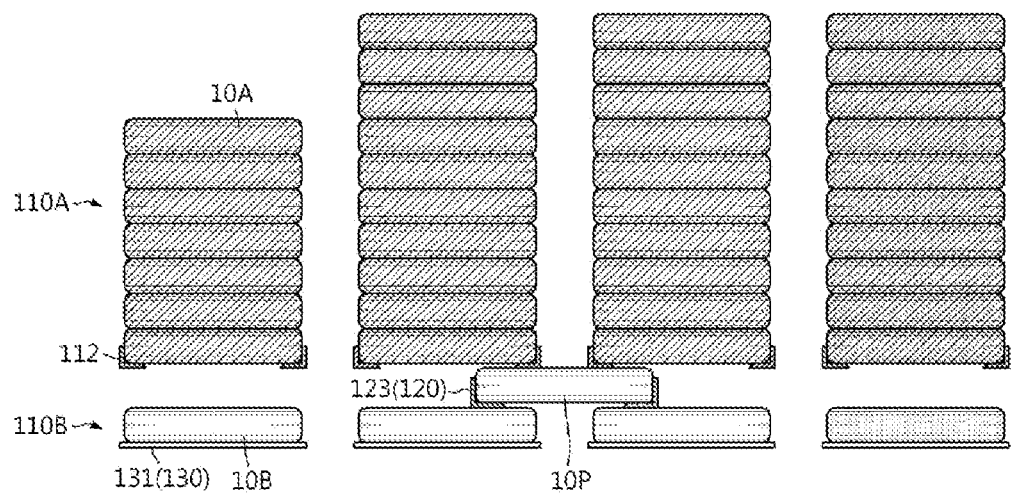
FIGS. 23 to 26 are front views conceptually illustrating operations of an auxiliary battery return process of the rental device according to one embodiment of the present invention.

FIG. 23 shows that the roller 122 of the carrier 120 pulls the battery 10P and receives the battery in the storage space 121 of the carrier when the user pushes the battery 10P through the battery port 102 to return the battery to the carrier 120 of the rental device in the standby state (as shown in FIG. 16). Meanwhile, in this state, seven batteries 10A are loaded in the leftmost rental queue 110A, and one battery 10B is loaded in the return queue 110.

Figure 24:
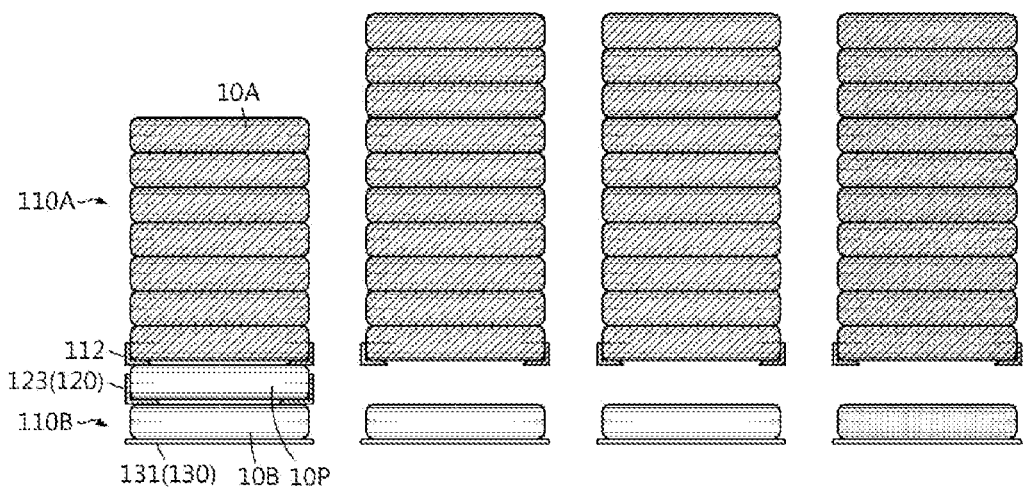

The carrier 120 having received the returned battery 10P moves the battery 10P to the return queue 110B (in this example, the leftmost return queue) to load the battery (FIG. 24). Then, the carrier nails 123 are opened to gently place the returned battery 10P stored in the storage space 121 onto the battery 10B loaded on the top of the return queue 110B.

Figure 25:
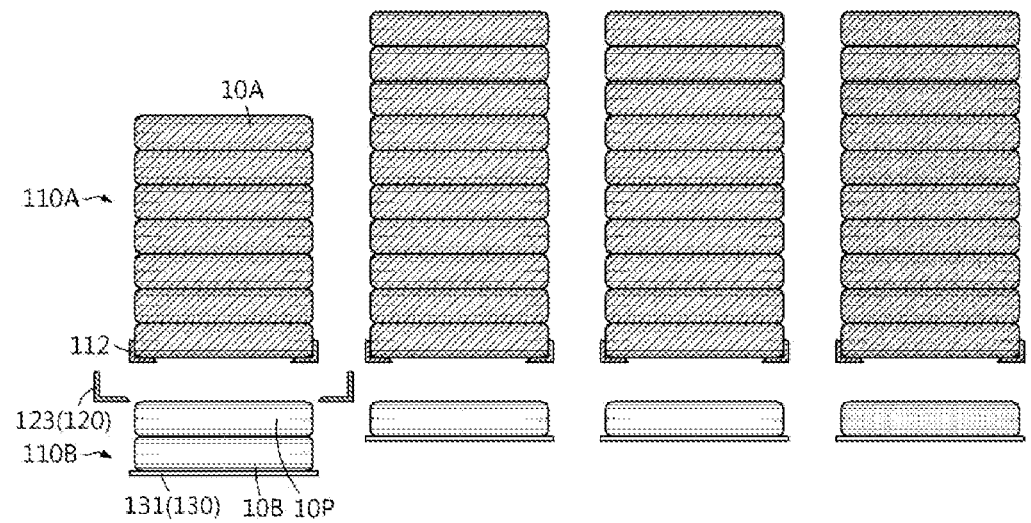
Figure 26:
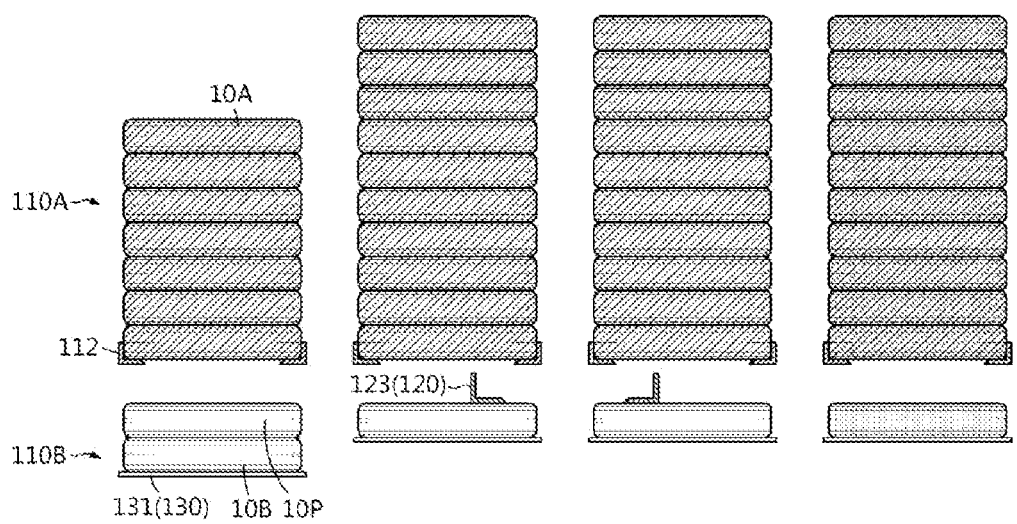

Accordingly, the lift 130 descends by one space to move down the batteries 10B and 10P loaded on the lift 130 such that the top surface of the just-loaded returned battery 10P is positioned at the same height as the bottom surface of the carrier 120 (FIG. 25).

Finally, the carrier 120 returns to the standby position and thus the return operation is completed, in which the leftmost return queue 110 is loaded with two batteries 10B and 10P that are added by one battery.

Meanwhile, the batteries 10B and 10A loaded in the return queue 110B or in the return queue and the rental queue 110A are always charged using the above-mentioned charging unit 140, except for the rental operation and return operation as described above, and the moving operation described later.

Then, the operation of moving the batteries from the return queue 110B to the rental queue 110A will be described with reference to FIGS. 27 to 30.

Figure 27:
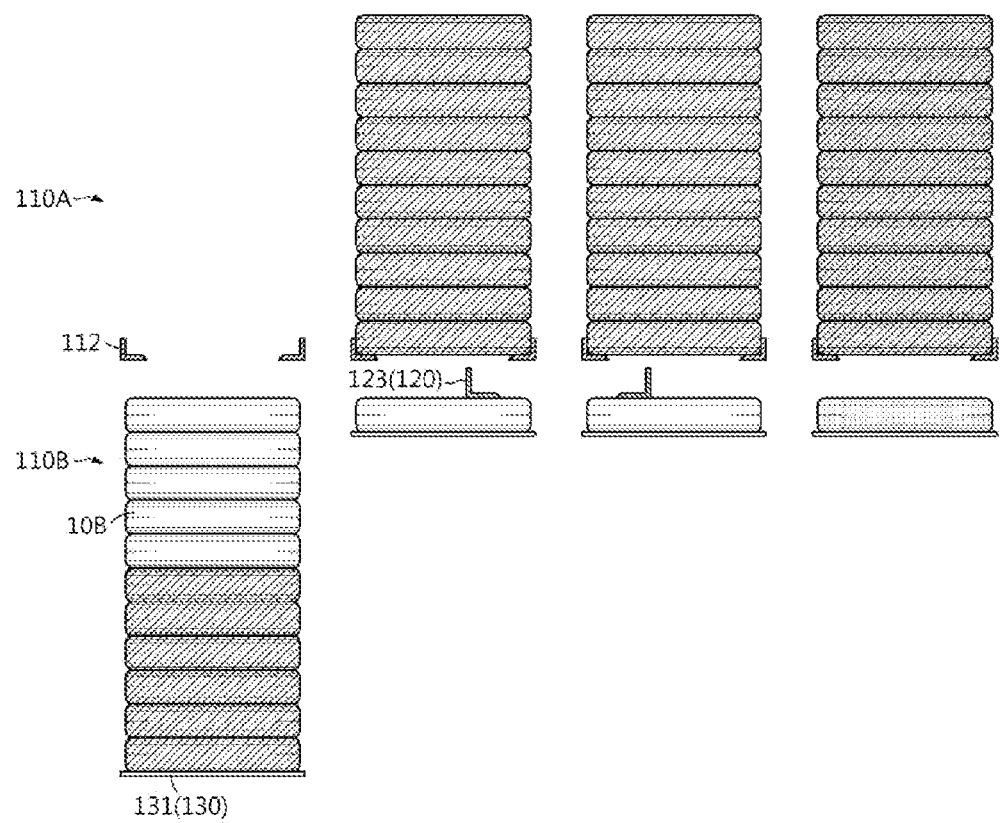
FIGS. 27 to 30 are front views conceptually illustrating a process of moving an auxiliary battery loaded on a return queue to a rental queue in the rental device according to one embodiment of the present invention.

FIG. 27 shows a typical situation where the batteries need to be moved from the return queue 110B to the rental queue 110A, in which the leftmost rental queue 110A is empty and the corresponding return queue 110B is full. Meanwhile, in this example, charging six batteries 10B returned first and begun in charging first has been completed among eleven returned batteries 10B loaded in the leftmost return queue 110B, and five batteries 10B returned and loaded later have not been charged yet.

Figure 28:
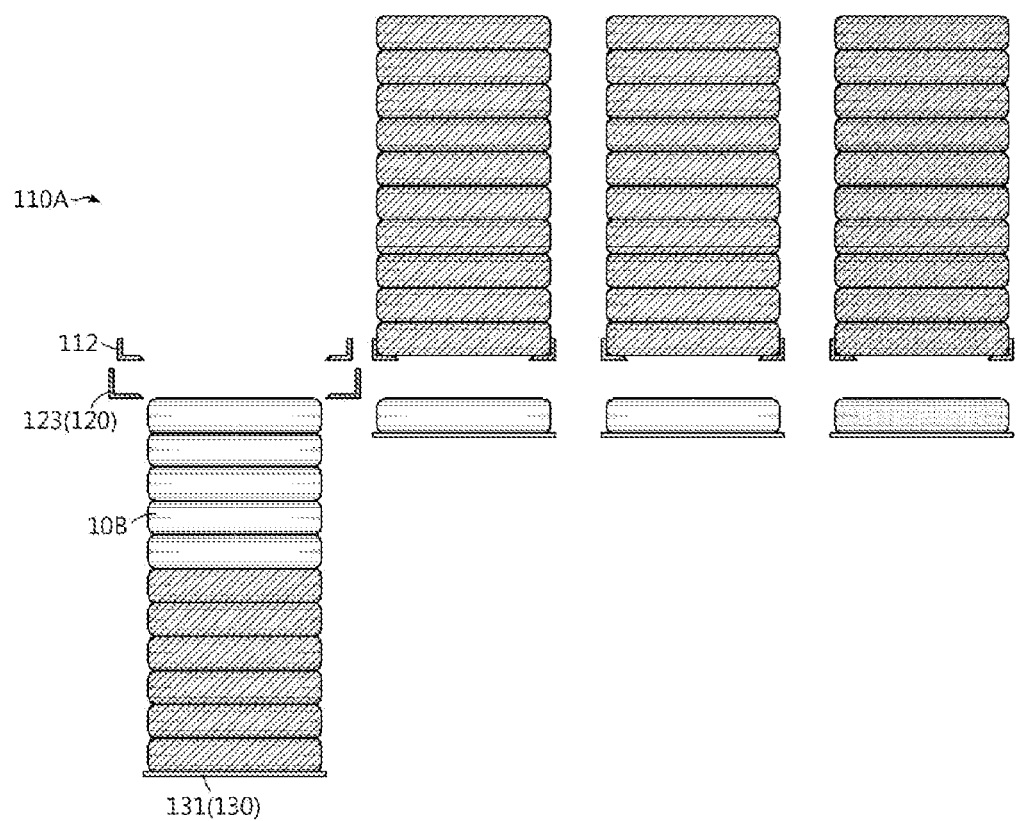

In this state, the first operation for moving (raising) the eleven batteries 10B loaded in the return queue 110B to the rental queue 110A is to move the carrier 120 such that the storage space 121 of the carrier 120 is aligned between the leftmost return queue 110B and the rental queue 110A. As described above, FIGS. 16 to 48 show the carrier 120 with only the carrier nails 123. This is because there may be the case in which the battery outside the carrier nails 123 cannot move up and down due to a carrier body or carrier sliding mechanism (see FIGS. 5 and 6). Accordingly, as shown in FIG. 28, the carrier 20 moves between the leftmost rental queue 110A and the return queue 110B, and the carrier nails 123 and queue nails 112 of rental queue are opened to allow the batteries 10B loaded in the return queue 110B to pass through the carrier 120 and be movable up toward the rental queue 110A.

Figure 29:
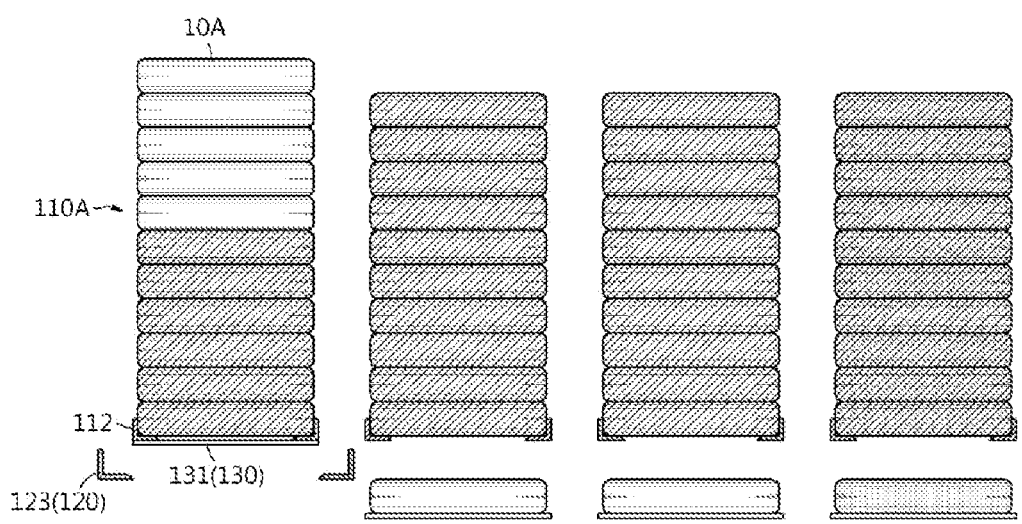
Figure 30:
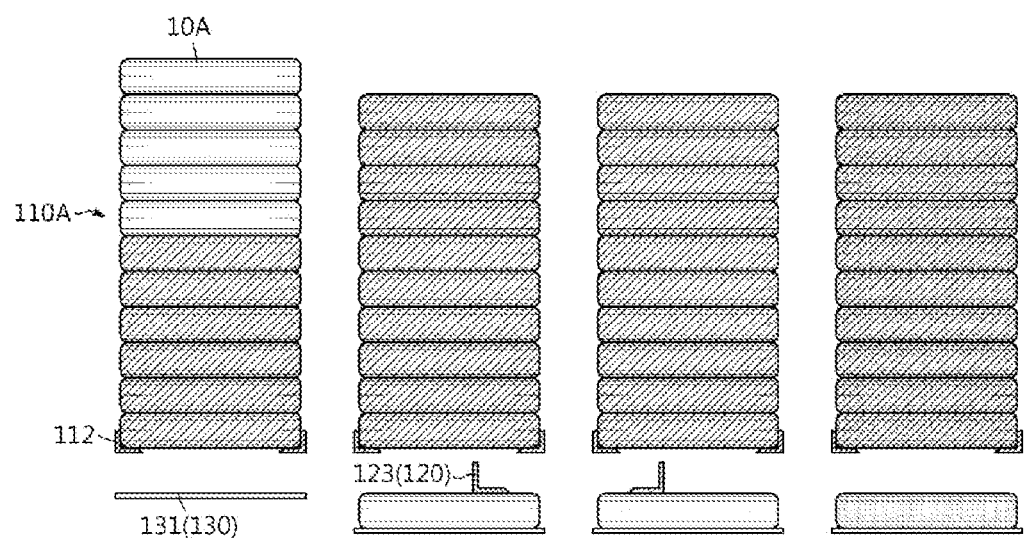

Then, the batteries 10B loaded in the return queue 110B are raised to the rental queue 110A using the lift 130, and the queue nails 112 are closed to support the lifted batteries 10A (FIG. 29). Then, after the lift 130 is lowered to a standby position, that is, a position where the battery to be returned can be directly loaded on the lift (the plate-shaped support member 131), the carrier 20 moves to the standby position (FIG. 30), and thus the moving operation is completed. As a result, eleven batteries 10A are loaded in the leftmost rental queue 110A. Meanwhile, charging is resumed by the charging unit 140 in the rental queue 110A for five batteries, in which the movement is completed and the charging is incomplete.

Accordingly, in the present embodiment, the batteries 10B returned to the return queue 110B is charged by the charging unit 140 except when the rental device is operating (renting, returning, and moving operations), and moved to the rental queue 110A so as to be provided to the rental, so that the auxiliary batteries can be cyclically rented.

In addition, in the present embodiment, when the returned battery is loaded to the return queue 110B, the battery is loaded and charged on a battery which is previously returned, the battery loaded at the bottom of the return queue 110B (first of all) is moved to the bottom of the rental queue 110A when moved, and the battery loaded at the bottom of the rental queue 110A is rented when rented. In other words, a so-called first-in and first-out method is employed in which a battery previously returned and loaded is rented first. Accordingly, it is possible to lend a battery that is returned first and has a longer charging time (charged first), so that a waiting time can be minimized and the rental device can be operated efficiently.

As described above, the rental device according to an embodiment of the present invention may allow the battery to be rented, returned, recharged, and rented automatically and cyclically without the management personnel. However, when the rental device is installed for the first time or when it is difficult to properly respond to rental demands due to uneven rental and return, charged batteries to be rented may be mounted at the same time by the management personnel. To this end, when the management personnel opens the housing 101 or a door of the rental device, the batteries is necessary to be loaded to the rental queue 110A. Specifically, it is sufficient that the queue frame 111A of the rental queue 110A may be opened towards a front of the device, or the rental queue 110A may be opened by opening the queue frame, which blocks the front of the device, using a door type. Alternatively, the return queue 110B may be formed with a front-opening structure or in a door mode in which the charged rental batteries are collectively mounted onto the return queue 110B, and then the above-described moving operation is performed, so that the batteries collectively mounted onto the return queue 110B may be moved to the rental queue 110A.

Meanwhile, the battery queue is divided into the rental queue 110A and the return queue 110B in the rental device of the above-described embodiment, but the rental device may be operated with one battery queue (a bundle of loaded batteries). In other words, batteries are managed by loading the batteries in a bundle, the batteries loaded in the battery queue are discharged from one end (the lowermost one) and rented one by one, the returned battery is loaded at the other end (the uppermost one). In this case, the operation of moving the batteries loaded in the return queue 110B to the rental queue 110A, as in the above-described embodiment, becomes unnecessary.

Hereinafter, the operation of the rental device according to another embodiment of the present invention will be described with reference to FIGS. 31 to 43 in which the rental and the return are performed using a single battery queue.

First, the configuration itself of the rental device according to the present embodiment is not different from the rental device of the above-described embodiment. In other words, the battery queue 110 of the rental device, as shown in FIGS. 2 and 3, the queue frame 111A constituting the rental queue 110A is installed above the carrier 120 together with the above-described queue nails 112 around the carrier 120, and a queue frame 111B constituting the return queue 110B is installed below the carrier 120 together with the above-described plate-shaped support member 131. In addition, the discharge and introduction of the batteries are carried out through a single battery port 102. However, the batteries are controlled to be loaded in a bundle. In other words, a physical battery queue formed by the queue frames 111A and 111B is divided into a rental queue and a return queue, but a conceptual battery queue as a bundle of loaded batteries is one.

It will be described in detail below. However, matters that overlap with the description in the above-described embodiment will be briefly described or omitted.

First, the battery rental operation of the rental device according to an embodiment of the present invention will be described with reference to FIGS. 31 to 35.

Figure 31:
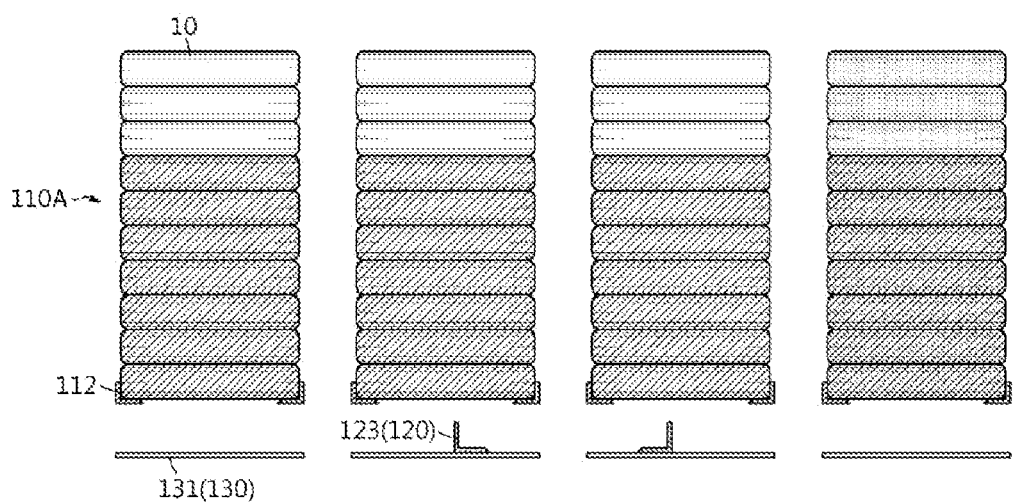
FIGS. 31 to 35 are front views conceptually illustrating operations of an auxiliary battery rental process of the rental device according to one embodiment of the present invention.

FIG. 31 as a standby state shows that each of the four rental queues 110A is loaded with ten batteries 10, in which the top three of the ten batteries are discharged (that is, returned) batteries, and the bottom seven are charged batteries. In other words, returned battery is loaded on the top of the return queue 110B upon return operation described later in the above-described embodiment, however, the returned batteries are sequentially loaded on top of the batteries currently loaded in the rental queue 110A as one bundle in the present embodiment (the detailed operation will be described later). Accordingly, the return queue 110B below the carrier 120 is empty. Herein, the above-described charging unit 140 is disposed at a rear side of the rental queue 110A and always charges the three discharged batteries except when the device is in operation.

Figure 32:
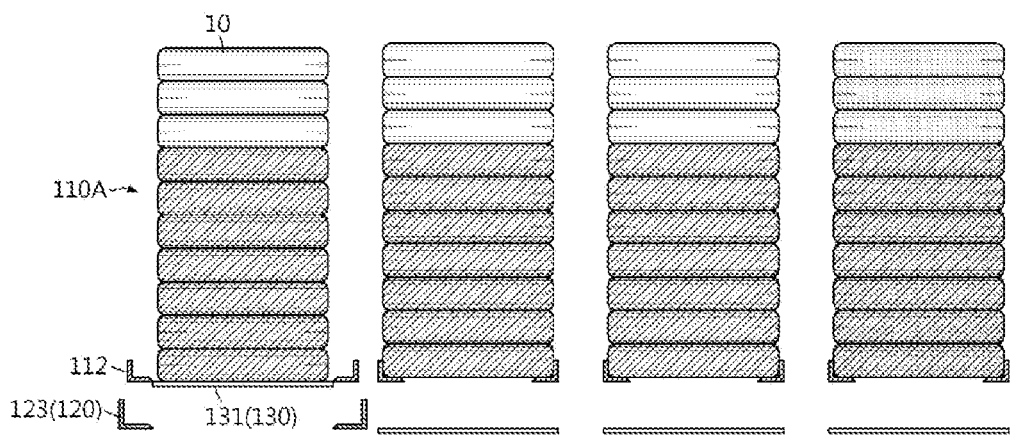

When a rental request is received from the user during the standby state, the carrier 120 moves below the rental queue 110A (hereinafter, described as the leftmost rental queue) on which a battery to be rented of a desired specification is loaded, opens the carrier nails 123, raises and places the lift 130 directly below the rental queue 110A, and opens the queue nails 112 of the rental queue 110A to gently put the batteries 10 loaded in the rental queue 110A onto the lift 130 (the plate-shaped support member)(FIG. 32).

Figure 33:
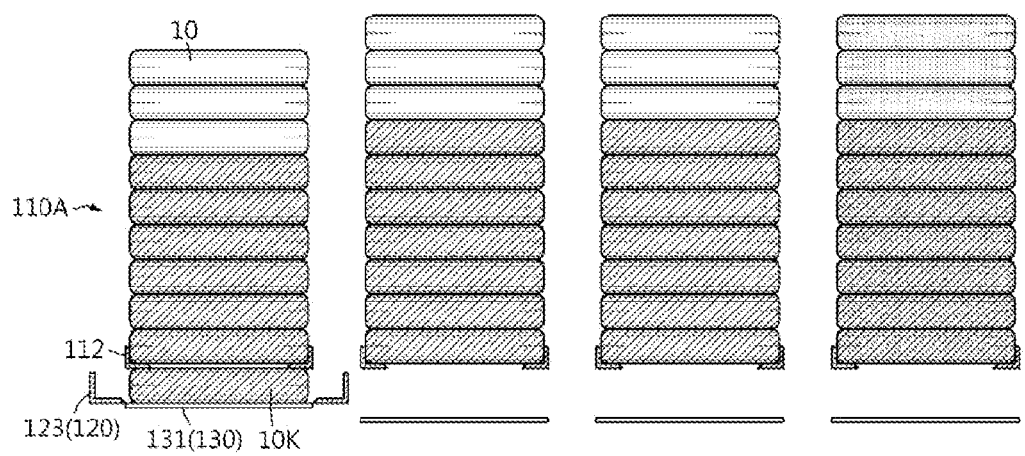
Figure 34:
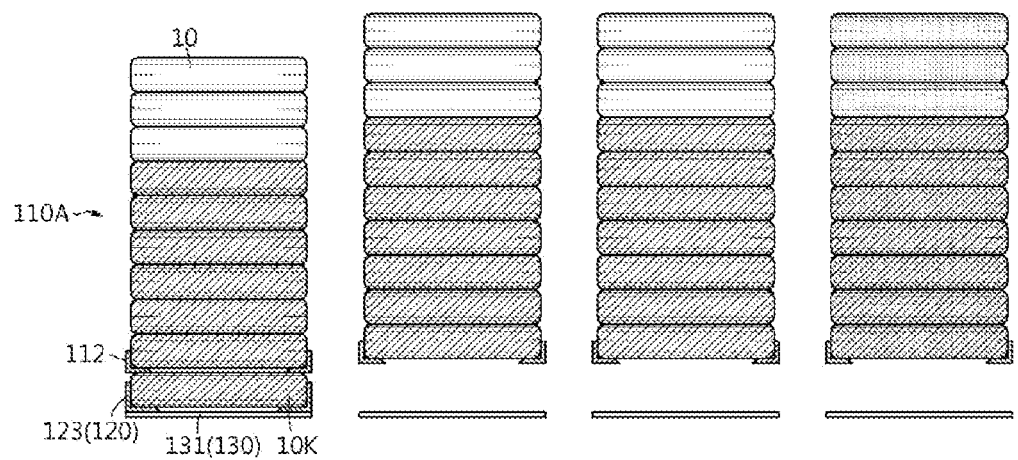

Then, the lift 130 descends to lower the entire batteries 10 by one space, and the queue nails 112 of the rental queue 110A are closed (FIG. 33). Accordingly, the battery 10K positioned directly below the closed queue nails 112 is disposed in the storage space 121 of the carrier 120. In this state, the carrier nails 123 are closed and the battery 10K disposed in the storage space 121 is gripped as an object to be rented (FIG. 34).

Figure 35:
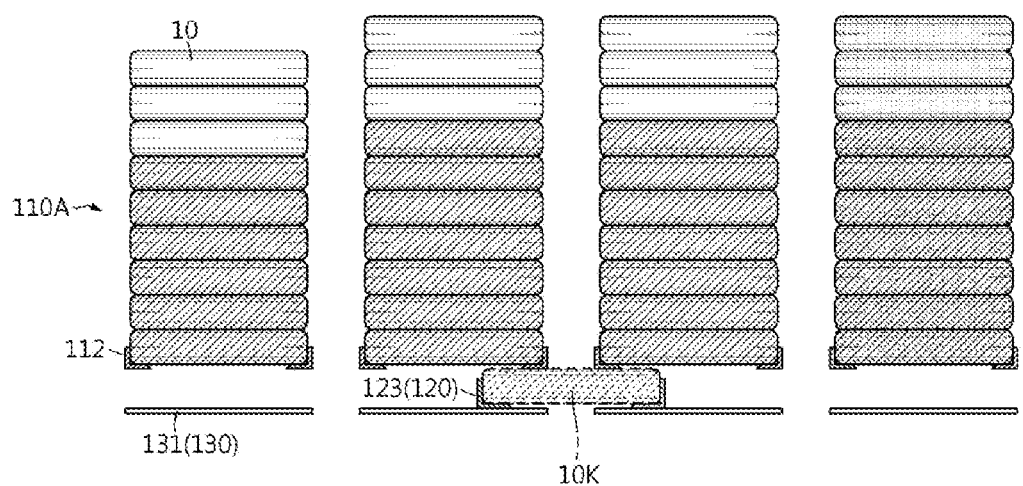

Then, after the carrier 120 is moved such that the storage space 121 is aligned with the battery port 102, the roller 122 (see FIG. 6) of the carrier 120 is driven, the battery 10K gripped by the carrier 120 is discharged to the battery port 102, and thus the rental device becomes in a standby state again (FIG. 35). Accordingly, the rental operation of the battery is completed, in which nine batteries 10 after reducing one are loaded in the leftmost rental queue 110A.

Accordingly, the rental operation in the rental device according to an embodiment of the present invention is substantially the same as in the above-described embodiment. In other words, when the rental operation is performed in a state in which the return queue 110B is empty in FIG. 16 of the above-described embodiment, it becomes substantially the same as in FIGS. 31 to 35 mentioned above.

Then, the battery return operation according to the present embodiment slightly different from the above-described embodiment will be described with reference to FIGS. 36 to 43.

Figure 36:
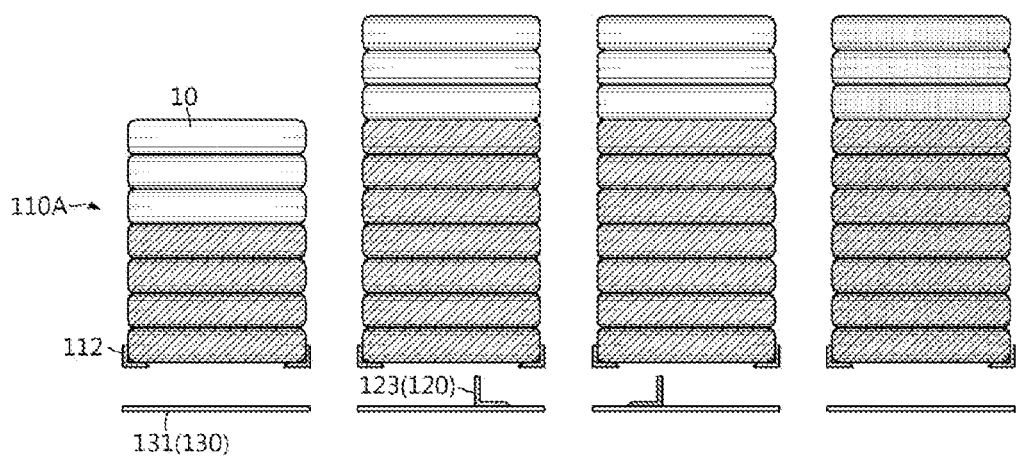
FIGS. 36 to 43 are front views conceptually illustrating operations of an auxiliary battery return process of the rental device according to one embodiment of the present invention.

FIG. 36 as a standby state shows that the leftmost rental queue 110A is loaded with seven batteries (three are discharged batteries and four are charged batteries), and the return queue 110B is empty.

Figure 37:
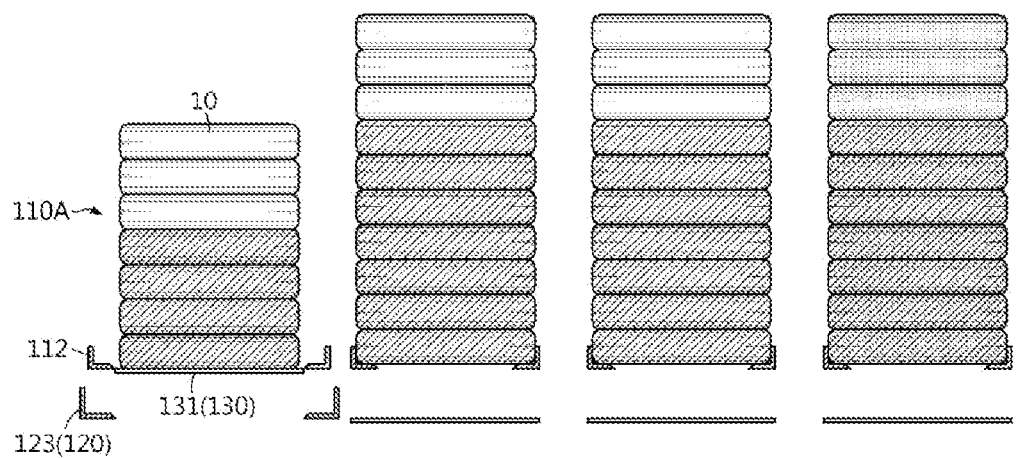

In this state, when the user operates the operation panel 104 (see FIG. 1) for return, the carrier 120 moves below the leftmost rental queue 110A. Then, after the carrier nails 123 are opened, the lift 130 moves up below the rental queue 110A, and the queue nails 112 are opened to gently place the batteries loaded in the rental queue 110A onto the lift 130 (FIG. 37).

Figure 38:
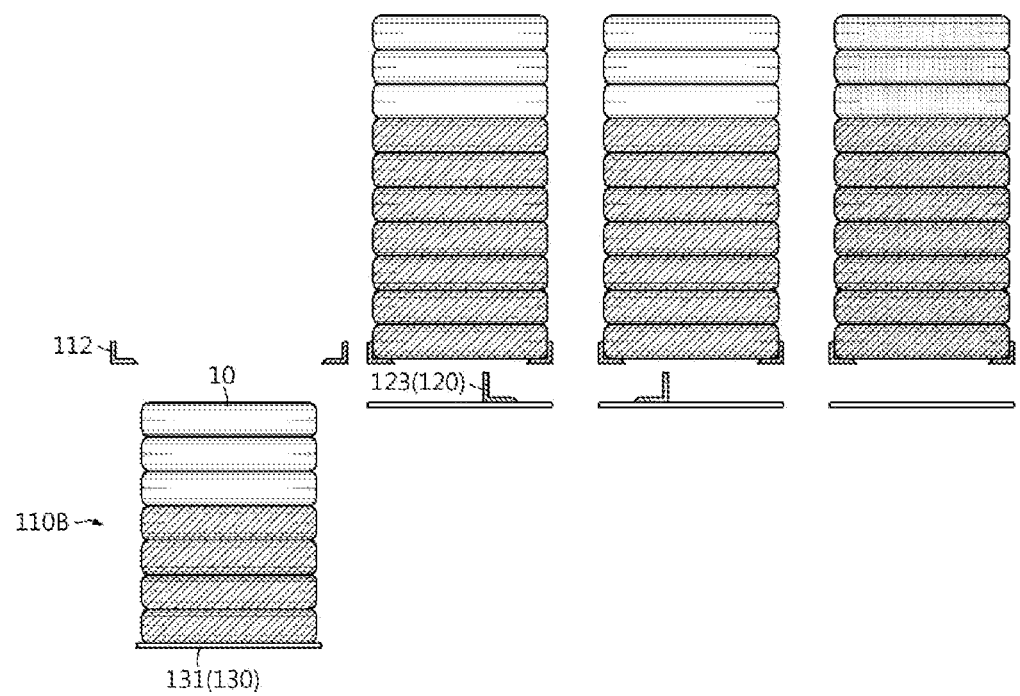
Figure 39:
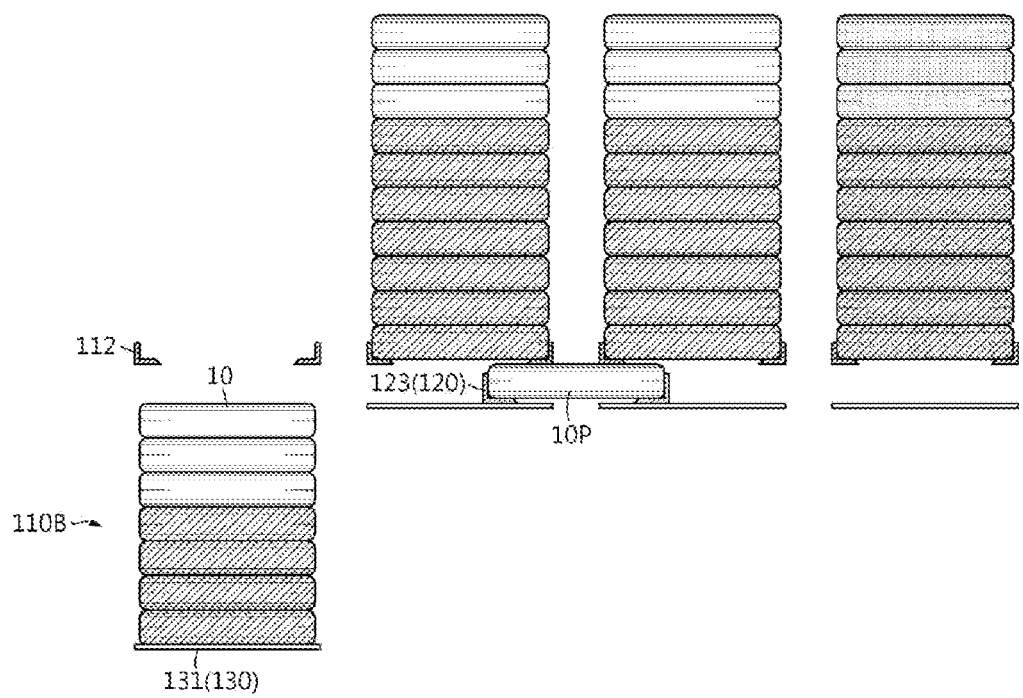
Figure 40:
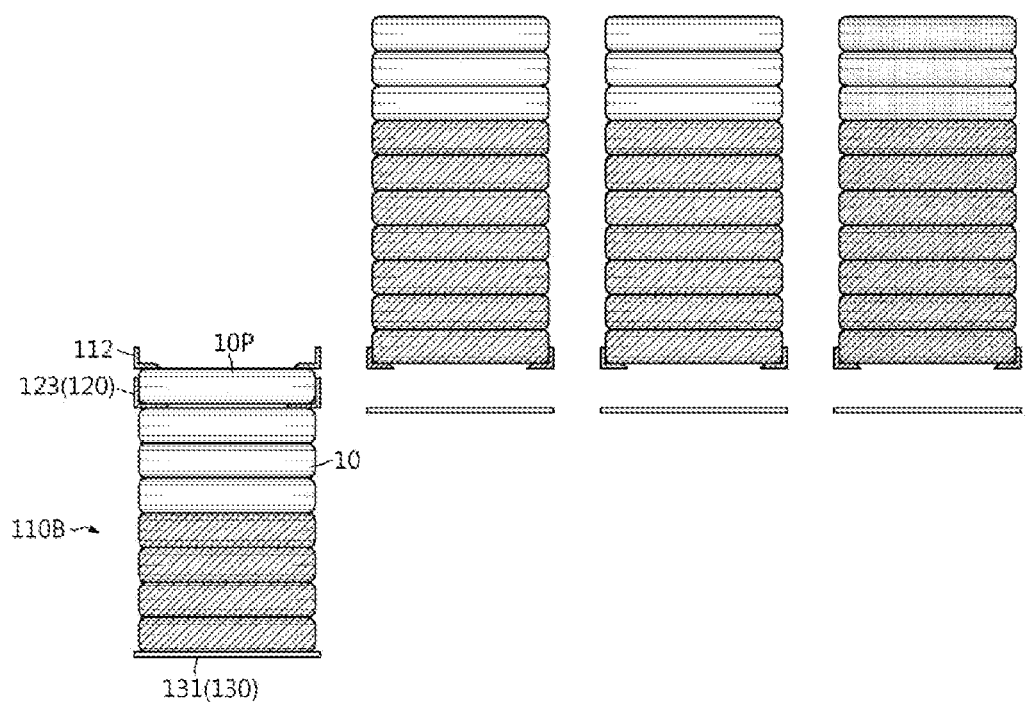
Figure 41:
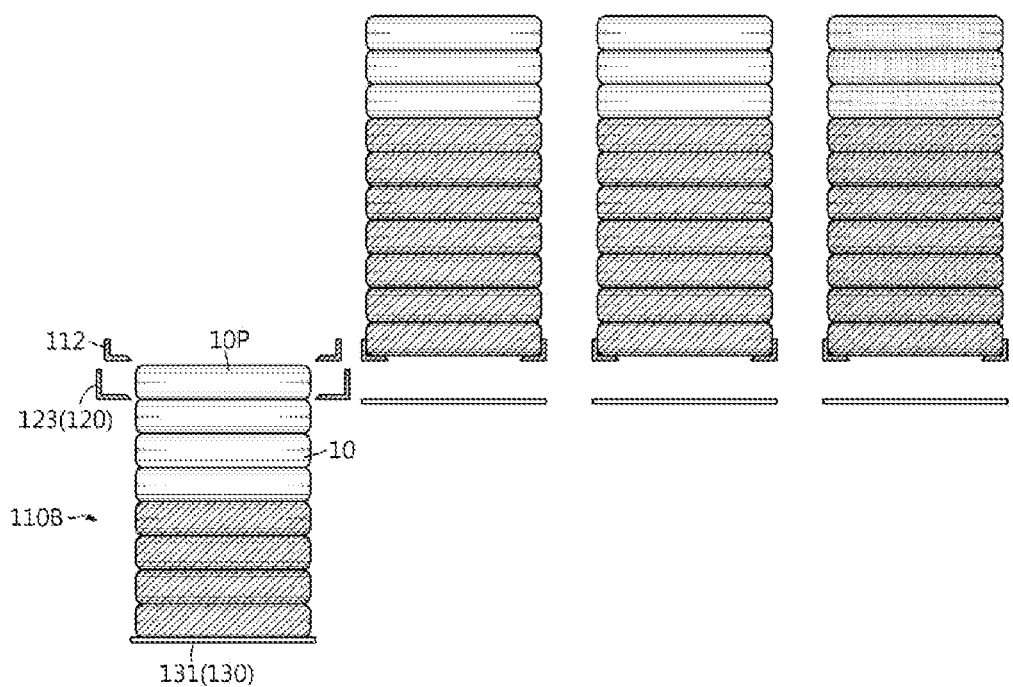

Then, the lift 130 moves down to allow the uppermost battery among the loaded batteries 10 to be positioned directly below the carrier 120, and the carrier 120 moves to the position of the battery port 102 (FIG. 38), thereby receiving the returned battery 10P into the storage space 121 (FIG. 39).

Figure 42:
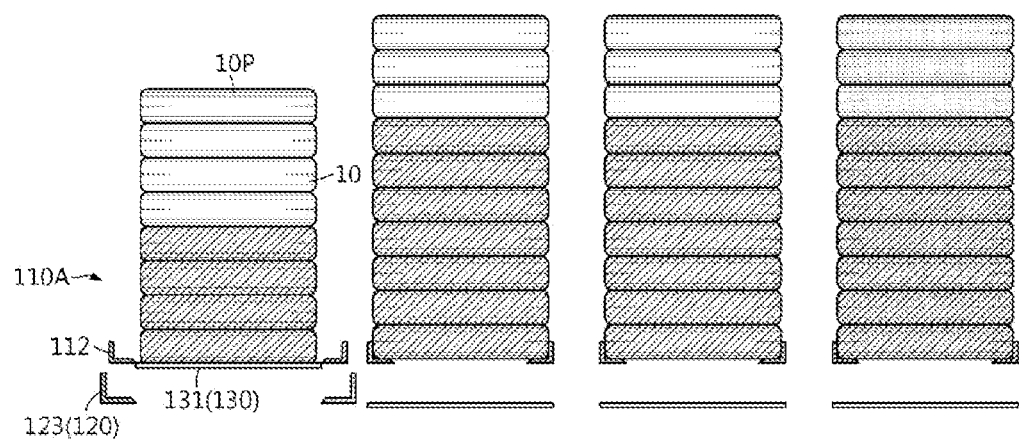
Figure 43:
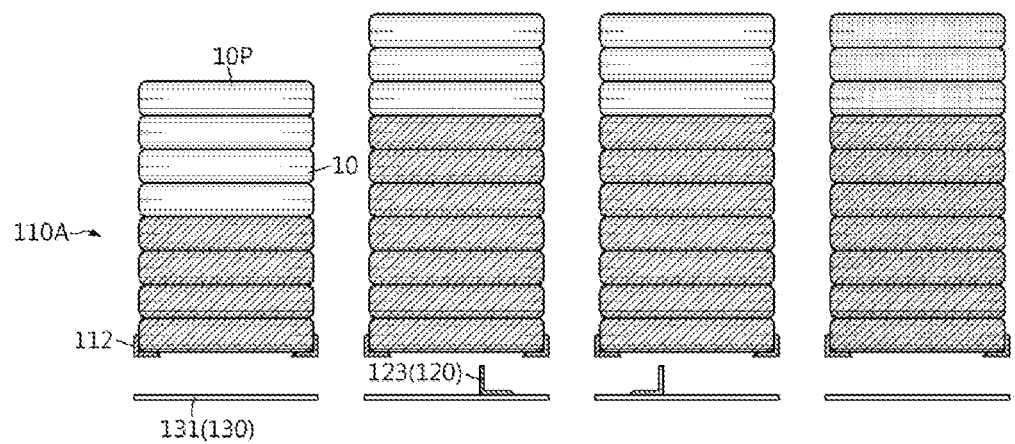

Then, the carrier 120 moves back to the leftmost battery queue 110 (FIG. 40), and the carrier nails 123 are opened to gently place the returned battery 10P stored in the storage space 121 onto the battery 10 loaded on the top of the return queue 110B. Then, the queue nails 112 are also opened (FIG. 41), and the lift 130 moves up to allow the lowermost battery among the loaded batteries to be positioned directly above the carrier 120 (FIG. 42).

Finally, the queue nails 112 are closed, the carrier 120 returns to the standby position and thus the return operation is completed, in which the leftmost rental queue 110A is loaded with eight batteries 10 and 10P that are added by one battery.

According to the return operation of the present embodiment, unlike the above-described embodiment, the batteries loaded in the rental queue 110A move to the return queue 1108, the returned battery 10P are loaded on top of the loaded batteries 10, and the entire batteries move to the rental queue 110A again. In addition, when the user pushes the battery into the battery port 102, the return operation immediately starts in the above-described embodiment (see FIG. 23). However, in the present embodiment, the user first is required to apply for a return through the operation panel 104 before the battery is inserted (FIG. 39) and the rental device is required to prepare to receive the returned battery (FIGS. 36 to 38). Accordingly, there is a disadvantage in that the battery port 102 in the standby state is required to be closed by means such as a door in order to prevent the user from inserting and returning the battery into the battery port 102 during the standby state and the return-preparing work.

However, the above disadvantage may be solved by defining the standby state differently. In other words, the standby state has been defined in the above description as a state in which the batteries are disposed in the rental queue 110A (see FIGS. 31 and 36). However, the standby state may be defined as a state in which batteries are disposed in the return queue 1108 (the batteries of all battery queues in FIG. 39 are in the return queue 1108 below the carrier 120. As a state before the battery 10P to be returned is inserted). Accordingly, when the user directly inserts the battery into the battery port 102 for return, the carrier 120 receives and loads the returned battery 10P onto top of the batteries 10 loaded in the return queue 1108, and thus the return may be completed. However, in this case, when the user makes a rental request, all the batteries 10 in the return queue 1108 are required to be raised to the rental queue 110A to lend a lowermost battery, and the charging unit 140 is required to be provided in the return queue 1108 other than the rental queue 110A.

In addition, in the present embodiment, the battery queue is operated with a single battery queue conceptually. However, since the rental queue 110A and the return queue 1108 are physically provided and only half of the total loading capacity may be utilized as an actual battery loading capacity, the availability for a volume of the device is lowered. Accordingly, another embodiment described below provides a rental device having a structure that may utilize all of the loading capacity of the battery queue, although one battery queue is operated as in the present embodiment.

Hereinafter, the configuration and operation of the rental device according to another embodiment of the present invention will be described with reference to FIGS. 44 to 48.

Figure 44:
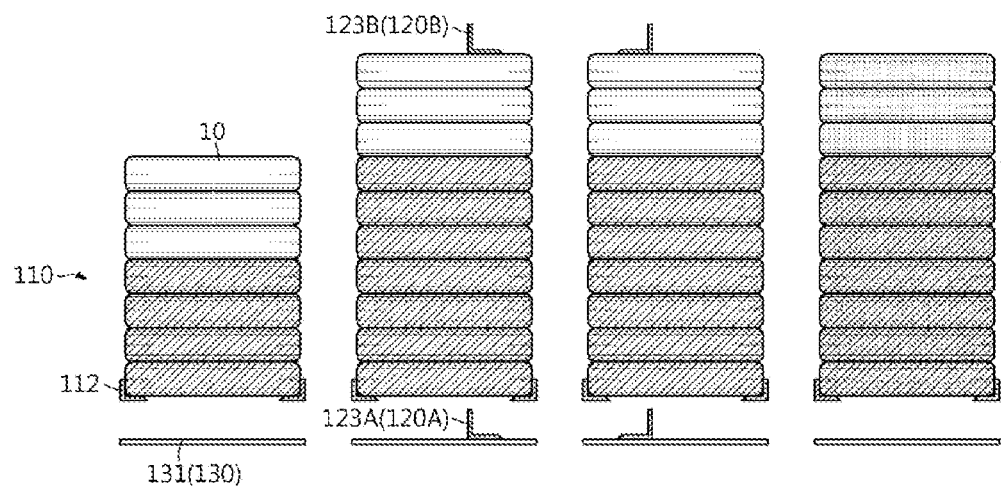
FIGS. 44 to 48 are front views conceptually illustrating operations of an auxiliary battery return process of the rental device according to one embodiment of the present invention.

First, the rental device according to an embodiment of the present invention, as shown in FIG. 44, is physically provided with one battery queue 110. Instead, the battery port is divided into a discharge port provided at a lower end of the battery queue 110 to discharge (lend) the battery, and a return port provided at an upper end of the battery queue 110 to allow the battery to be inserted (returned). In addition, a rental carrier 120A and a return carrier 120B are separately provided at the same heights as the battery discharge port and the battery return port, respectively, in response to the battery discharge port and the battery return port.

Herein, the battery discharge port and the battery return port differ only in the height and the number thereof, but have the same configurations as the battery port 102 of the above-described embodiments. The rental carrier 120A and the return carrier 120B also differ only in the height and the number thereof, but have the same configurations as the carrier 120 of the above-described embodiments. Meanwhile, the battery queue 110 of the present embodiment has a configuration obtained by adding components 131, 132, 133, and 134 of the lift provided in the return queue 1108 to the rental queue 110A (including the queue frame 111A and the queue nails 112) of the above-described embodiments.

FIG. 44 shows the standby state in the rental device according to the present embodiment for the above configuration. In the standby state, the leftmost rental queue 110 is loaded with seven batteries (three are discharged battery and four are charged battery), and the rental carrier 120A and the return carrier 120B are aligned with the battery discharge port and the battery return port, respectively. Meanwhile, since the rental operation in the present embodiment is the same as the rental operation in the above-described embodiment described with reference to FIGS. 31 to 35, hereinafter, only the battery return operation of the rental device according to the present embodiment will be described.

Figure 45:
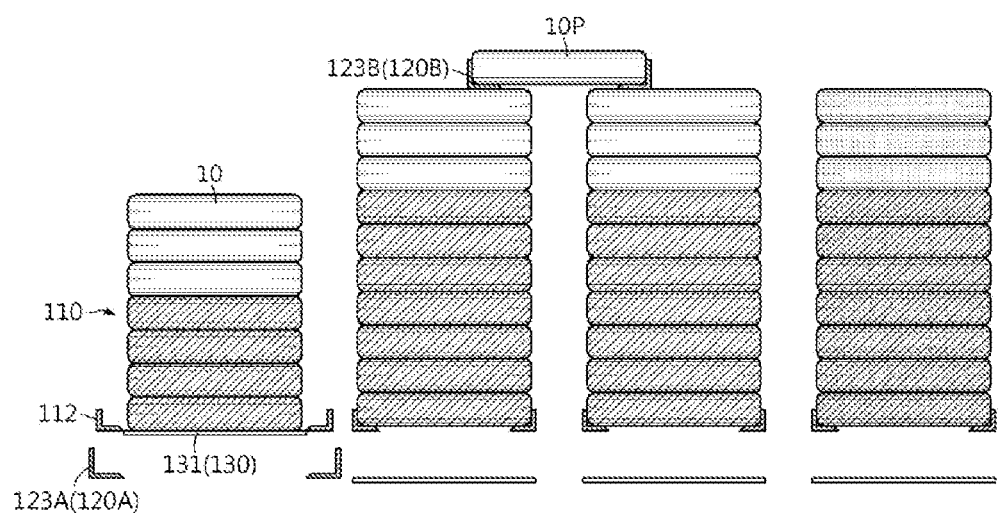

As shown in FIG. 45, when the user pushes the battery 10P to the return carrier 120B of the rental device in the standby state through the battery return port to return the battery (FIG. 44), the roller 122 of the return carrier 120B pulls the battery 10P and receives the battery into the storage space 121 of the return carrier. Then, the rental carrier 120A is moved below the battery queue 110 (the leftmost battery queue) to load the returned battery 10P, the carrier nails 123A of the rental carrier 120A are opened, and the lift 130 is raised just below the leftmost battery queue 110. Then, the queue nails 112 of the battery queue 110 are opened to gently place the batteries 10 having been loaded in the battery queue 110 onto the lift 130.

Figure 46:
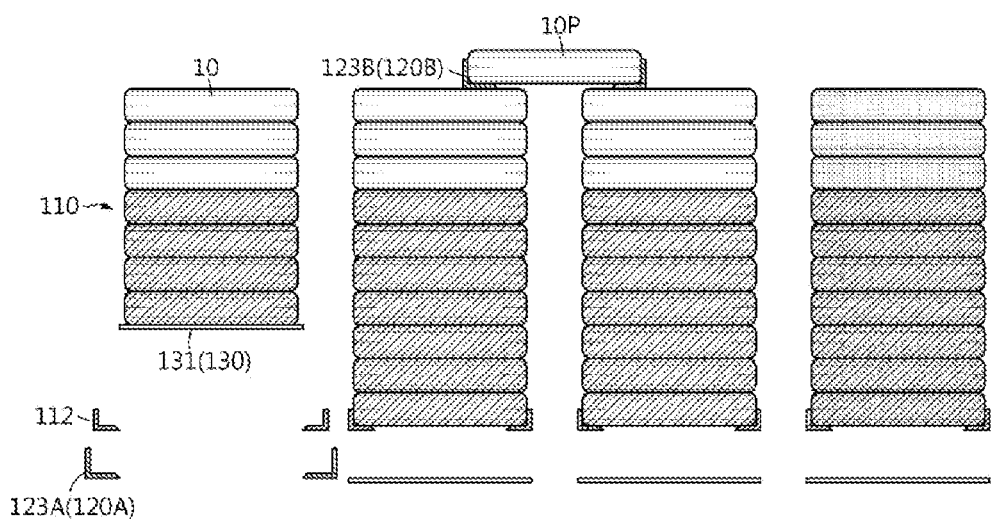

Then, as shown in FIG. 46, the lift 130 raises the batteries 10 loaded in the battery queue 110, such that the top surface of the battery 10 loaded on the top is positioned at the same height as the bottom surface of the return carrier 120B.

Figure 47:
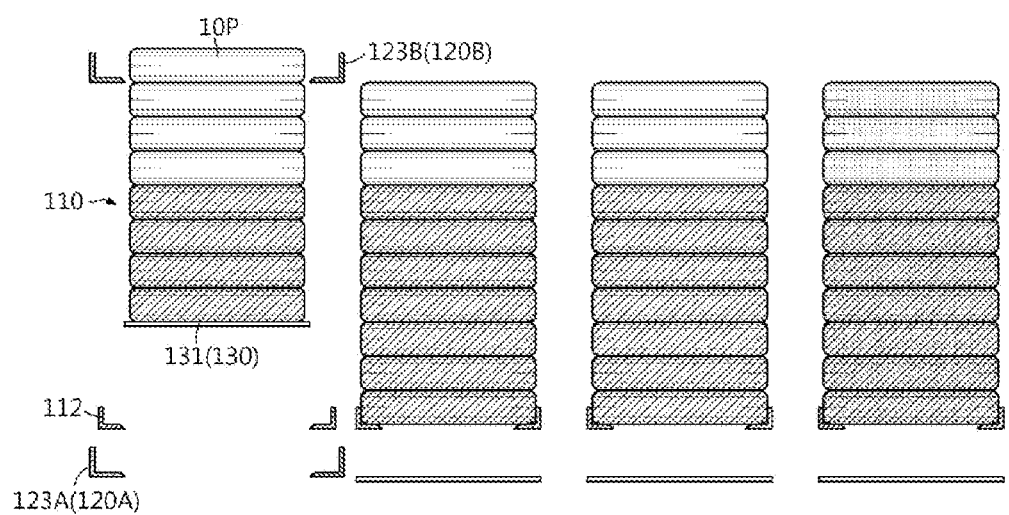

Then, as shown in FIG. 47, the return carrier 120B that has received the returned battery 10P moves the battery 10P to the leftmost battery queue 110, and the carrier nails 123B are opened to gently place the returned battery 10P stored in the storage space 121 onto the battery 10 loaded on the top of the battery queue 110.

Figure 48:
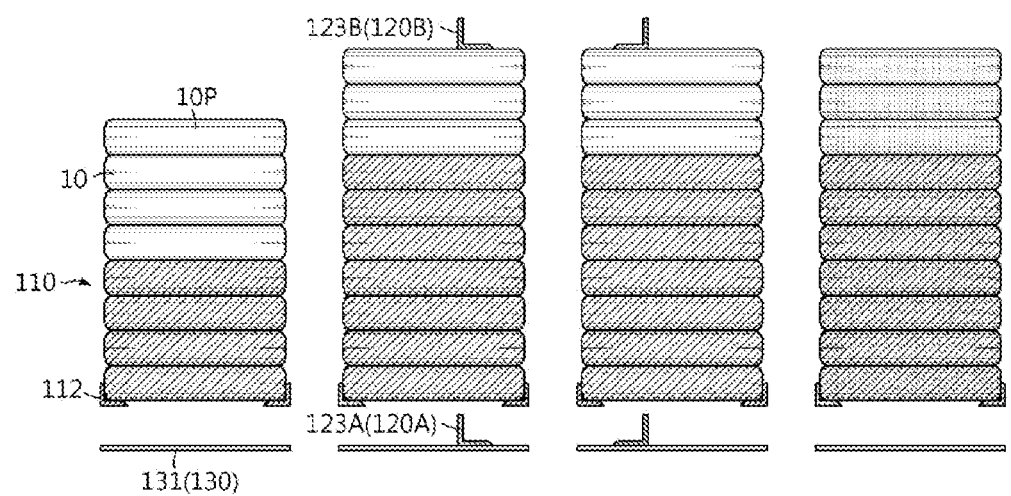

Accordingly, the lift 130 lowers the batteries 10 and 10P loaded in the battery queue 110 so that the battery 10 loaded at the bottom is positioned directly above the rental carrier 120A, and the queue nails 112 of the battery queue 110 are closed to support the loaded batteries 10 and 10P. Then, the lift 130 returns to the initial position, the rental carrier 120A and the return carrier 1208 are returned to the initial positions, and thus the return operation is completed (FIG. 48). In the returned state, the leftmost battery queue 110 is loaded with eight batteries 10 and 10P that are added by one battery.

Although the rental carrier 120A and the return carrier 120B have been described as being sequentially moved in the above description, the rental carrier 120A and the return carrier 1208 may simultaneously move in parallel unless the rental carrier 120A and the return carrier 1208 interfere with the return operation.

Accordingly, in the present embodiment, one conceptual and physical battery queue 110 is used, and the rental and the return are performed using the carriers 120A and 120B and the battery ports (the discharge port and the return port), respectively. Accordingly, compared to the above-described embodiment described with reference to FIGS. 31 to 43, a vertical moving width of the loaded batteries may be reduced, and an entire loading capacity of the battery queue 110 may be utilized as an actual battery loading capacity.

Meanwhile, the above embodiments have illustrated and described that the battery at the bottom of the battery queue is discharged and rented when the battery is rented, and the returned battery is loaded on the top of the battery queue (return queue). However, on the contrary, the battery loaded on the top of the battery queue may be rented, and the returned battery may be inserted into and loaded on the bottom of the battery queue.

Meanwhile, the auxiliary battery rental device 100 according to the present invention may be installed in a number of places, and may be centrally controlled by a server, or established as mobile power infrastructure that is controlled in a parallel or distributed way.

In addition, the rental device 100 according to the present invention may be operated as a system that allows a direct rent/return on site without additional membership, may be operated as a membership system that requires a preliminary registration, or a combination thereof may be available. In addition, operations by the user, such as membership registration and rental/return application, and user interface may be implemented by the operation panel 104 of the rental device 100, may be implemented in the form of a smart phone application, and may be implemented by interworking the operation panel and the smart phone application.

Then, the auxiliary battery 10, which is particularly suitable for the auxiliary battery rental device 100 of the present invention, according to another aspect of the present invention will be described. As described above, the conventional auxiliary battery requires a separate connector and a connector cable for connecting the battery to a portable electronic device. Accordingly, the conventional auxiliary battery rental device is configured and operated to separately lend and receive the connector cable together with the auxiliary battery. However, this causes problems such as loss or non-return of the connector cable. Accordingly, according to the present invention, the connector (connector cable) is integrally accommodated into the auxiliary battery to prevent the above problem.

Figure 49:
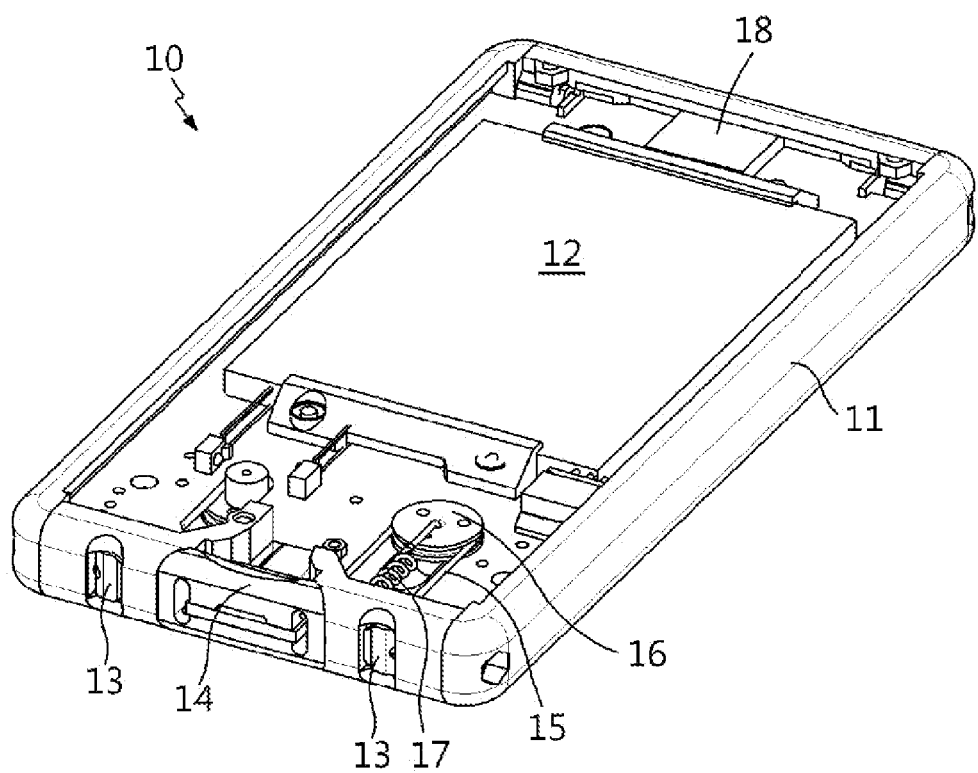
FIG. 49 is a perspective view illustrating the auxiliary battery after omitting top and bottom cases thereof according to one embodiment of the present invention.
Figure 50:
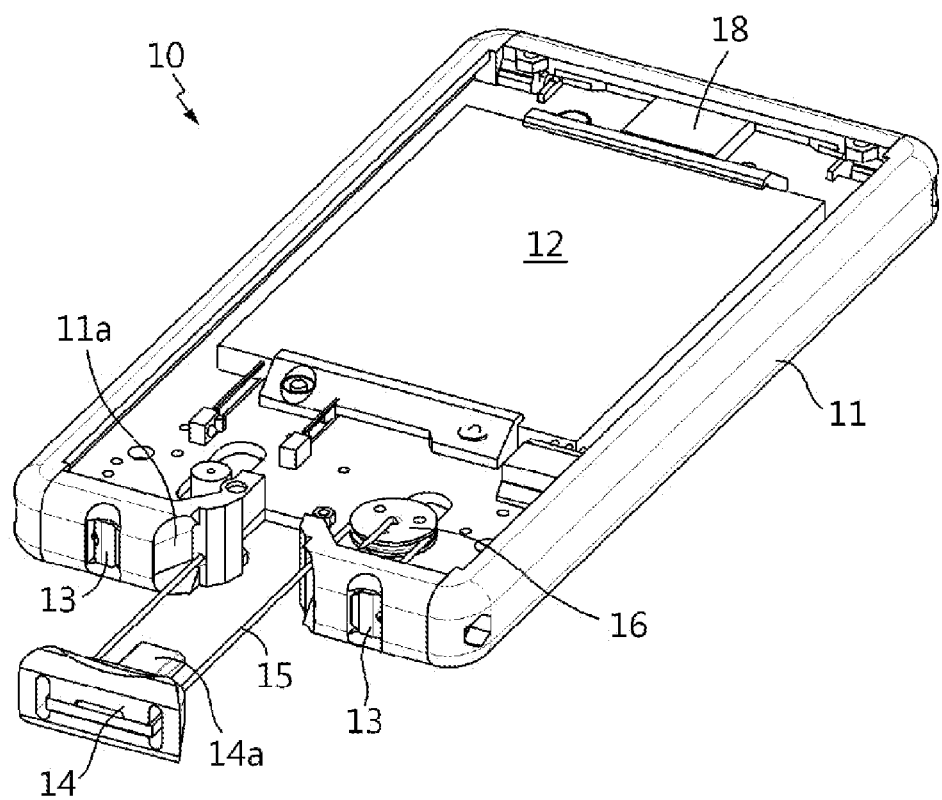
FIG. 50 is a perspective view illustrating a state in which a connector is ejected from the auxiliary battery illustrated in FIG. 49.
Figure 51:
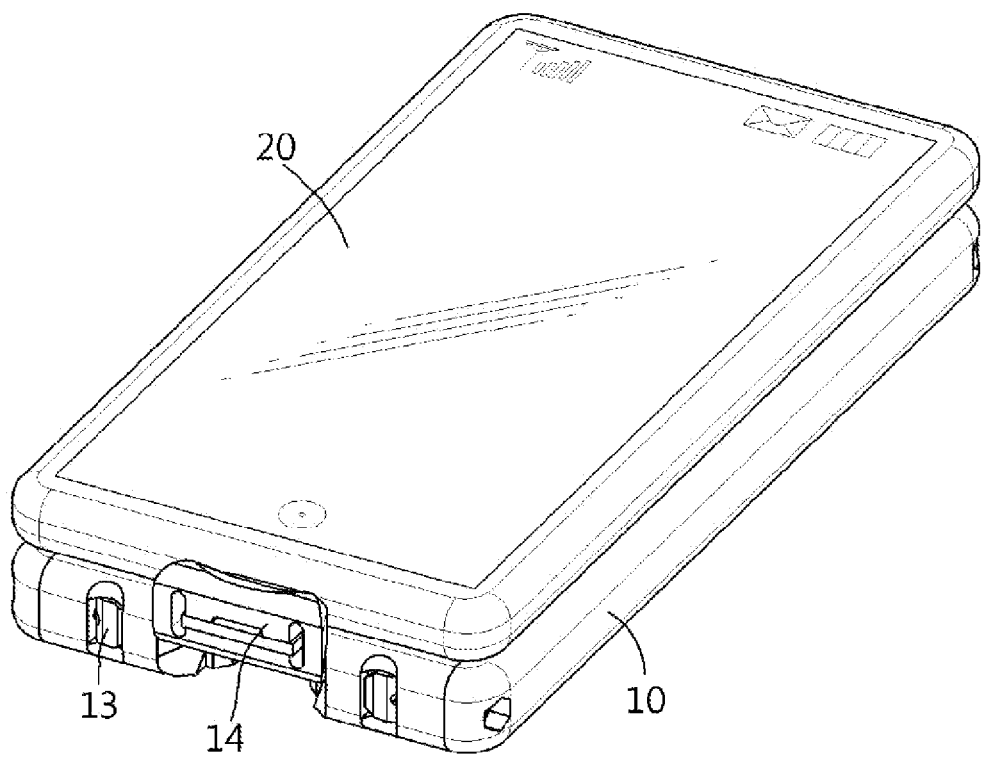
FIG. 51 is a perspective view illustrating a state of use of the auxiliary battery according to one embodiment of the present invention.

FIG. 49 is a perspective view illustrating an internal configuration of the auxiliary battery according to one embodiment of the present invention. FIG. 50 is a perspective view illustrating a state in which the connector is ejected from the auxiliary battery of FIG. 49. FIG. 51 is a perspective view illustrating a state of using the auxiliary battery.

As shown in FIGS. 49 and 50, the auxiliary battery 10 according to an embodiment of the present invention includes a case 11 (the upper and lower cases are omitted in FIGS. 49 and 50), a battery cell 12 accommodated inside the case 11, and a connector 14 electrically connected to the battery cell 12 and connectable to a power connector of the electronic device. Since the case 11 and the battery cell 12 are substantially the same as those of a general auxiliary battery, the detailed description will be omitted. Hereinafter, a difference from the general auxiliary battery will be described with respect to the connector 14 that is a feature of the present invention.

The connector 14 of the battery 10 according to an embodiment of the present invention is seated on a seating groove 11a formed at one side of the case 11 so as to be elastically ejected. In other words, During a normal situation, the connector 14 is seated in the seating groove 11a, an outer surface of the connector 14 is leveled with a surface of the case 11, and a connector pin 14a (see FIG. 50) connected to a power connector of an electronic device is not exposed outside the case 11 (see FIG. 49). However, when the user pulls the connector 14, the connector 14 including the connector pin 14a is ejected together with a connector wire 15 by a predetermined length, and thus the connector pin 14a is exposed, so that the auxiliary battery 10 can be used by connecting the connector pin to the power connector of the electronic device 20 (smart phone) (see FIGS. 50 and 51). In addition, when the use of the battery 10 is finished and a force pulling the connector 14 is removed, the connector 14 returns to an initial state (being seated in the seating groove 11a) by an elastic force.

In order to implement the above elastically ejected connector 14, with regards to the auxiliary battery 10 according to an embodiment of the present invention, one end of a pair of connector wires 15 is fixed to a surface facing the connector seating groove 11a of the connector 14, the pair of connector wires 15 are wound to a pair of movable pulleys 16 elastically biased by springs 17, respectively, and the other end of the connector wire 15 is fixed inside the case 11. Herein, the spring 17 is a compression spring that elastically biases such that the movable pulley 16 is pushed away toward a deep inside of the case 11. Accordingly, in a normal state where the battery 10 is not used or in a state where the battery 10 is loaded in the above-described auxiliary battery rental device 100, the connector 14 is seated in the connector seating groove 11a, and the connector 14 is ejected with the elastic force when the connector 14 is pulled out. In addition, when the force for pulling the connector 14 is removed, the connector 14 is automatically seated in the connector seating groove 11a by an elastic restoring force of the spring 17.

In addition, since the pair of connector wires 15, the pair of movable pulleys 16 and the pair of springs 17 are used, unbalanced force or torque may be absorbed even for predetermined twisting or unbalanced pulling up, down, left and right after the connector 14 is ejected. When the force is removed, the connector 14 may be seated in the connector seating groove 11a while being automatically balanced.

Meanwhile, the connector wire 15 may also function as a connector cable. In other words, the connector wire 15 may be electrically connected to the battery cell 12 to supply power from the battery cell 12 to the connector pin 14a, and transfer an electrical signal such as a control signal between the electronic device 20 and the battery cell 12.

Thus, since the auxiliary battery 10 according to the present embodiment accommodates the connector and the connector cable, and the connector 14 is not exposed and has the same appearance as a normal auxiliary battery when not used, additional rent and return of a separate connector cable is unnecessary when used in a battery rental device such as the above-described auxiliary battery rental device 100, so that the configuration of the battery rental device can be simplified and the problems such as loss or non-return of the connector cable can be prevented.

Meanwhile, the auxiliary battery 10 according to an embodiment of the present invention may further include an auxiliary connector 18 in addition to the connector 14 having the above-described structure. The auxiliary connector 18 may have specifications the same as or different from the above-described connector 14. Further, the auxiliary connector 18 may also be configured to be elastically ejected from the other side of the case 11 in the same manner as the above-described connector 14. Accordingly, in particular, when an auxiliary connector 18 having another specification is further provided in addition to the connector 14, one auxiliary battery 10 may support smart phones of different specifications, and types of smart phones are not required to be distinguished in the auxiliary battery rental device, so that the process of controlling the rental device can be simplified, and a rapid increase of demands for rental of a battery having a specific specification can be handled.

In addition, one side of the case 11 of the auxiliary battery 10 according to an embodiment of the present invention may be provided with a pair of charging terminals 13 for charging the battery. When the auxiliary battery 10 according to an embodiment of the present invention is loaded in the battery queue 110 of the above-described auxiliary battery rental device 100, the pair of charging terminals 13 come into contact with the charging pins 141 of the charging unit 140 of the rental device described with reference to FIGS. 13 to 15, thereby allowing the battery 10 to be automatically charged while being loaded in the battery queue 110.

Further, another pair of charging terminals in the auxiliary battery 10 according to an embodiment of the present invention may be further provided at the other side symmetrically opposite to one side of the case provided with the above pair of charging terminals 13, in addition to the pair of charging terminals 13. Accordingly, when the auxiliary battery 10 of the present invention is returned to the above-described auxiliary battery rental device 100, the returned battery can be charged at any time by the charging unit 140 provided at the rear of the battery queue 110 regardless of whether an inserting direction of the battery 10 into the battery port 102 is a front or a rear of the battery 10.

Meanwhile, although the movable pulley 16 and the compression spring 17 are employed as a configuration for elastically ejecting the connector 14 of the auxiliary battery 10 in the above-described embodiment, a tension spring installed on the opposite side of the compression spring 17 may be used, a leaf spring or a wire spring other than a coil spring may be used, and a power cord ejection/return mechanism in a vacuum cleaner or the like may be employed.

In addition, the battery 10 may include a memory for storing a unique ID, a rental/return history, a user ID, a usage control program of the battery, and the like. The information stored in the memory may be used to determine whether the rented battery was misused or wrongfully used, and whether the returned battery is defective, and also may be used to statistically analyze using behaviors of users.

Although the present invention has been described with reference to the limited embodiments and drawings, the present invention is not limited thereto. It will be apparent that a person having ordinary skill in the art may carry out various deformations and modifications within the scope without departing from the idea of the present invention, the following claims and equivalents thereof.

The invention claimed is:

1. An auxiliary battery rental device performing rental and return of auxiliary batteries, the auxiliary battery rental device comprising:
a battery port allowing the auxiliary batteries to be discharged therefrom or returned thereto;
a battery queue on which the auxiliary batteries to be rented or having been returned are vertically stacked and loaded;
a carrier configured to discharge the auxiliary batteries loaded on the battery queue to the battery port, or load the auxiliary batteries returned through the battery port onto the battery queue;
a lift configured to move up and down at least a part of the auxiliary batteries loaded on the battery queue;
a charging unit configured to charge at least a part of the auxiliary batteries loaded on the battery queue; and
a control unit configured to control an operation of the rental device such that rental and return operations of the auxiliary batteries are automatically performed, wherein:
the battery queue includes a rental queue and a return queue disposed to vertically face each other with the carrier interposed therebetween;
the carrier operates to discharge the auxiliary battery loaded on the rental queue to the battery port upon a rental request of a user and load the auxiliary battery returned through the battery port onto the return queue; and
the lift operates to move and load a part or all of the auxiliary batteries loaded on the return queue onto the rental queue.

2. The auxiliary battery rental device of claim 1, wherein:
the auxiliary battery rental device is configured to allow the auxiliary batteries to be rented on a first-in and first-out basis, in which the carrier operates such that an auxiliary battery loaded first is discharged first among the auxiliary batteries loaded on the rental queue, and
the lift operates to move the auxiliary battery loaded on the return queue to the rental queue such that an auxiliary battery returned and loaded on the return queue is disposed at a position to be discharged first from the rental queue.

3. The auxiliary battery rental device of claim 2, wherein:
the battery port is a single battery port;
the carrier is installed with a fixed vertical height equal to a height of the battery port;
the carrier, during the rental operation, discharges an auxiliary battery closest to the carrier among the auxiliary batteries loaded on the rental queue to the battery port;
the carrier, during the return operation, loads an auxiliary battery returned through the battery port onto a position closest to the carrier from the return queue; and
an auxiliary battery loaded farther from the carrier on the return queue is loaded relatively closer to the carrier in the rental queue when the auxiliary battery loaded on the return queue moves to the rental queue by the lift.

4. The auxiliary battery rental device of claim 1, wherein:
a plurality of pairs of the battery queues are provided in left and right directions when viewed from a front of the auxiliary battery rental device, and
the carrier is configured to slide left and right after gripping the auxiliary battery when viewed from the front of the auxiliary battery rental device.

5. The auxiliary battery rental device of claim 1, wherein the carrier is configured to push out the auxiliary battery through the battery port or pull and grip the auxiliary battery returned through the battery port.

6. The auxiliary battery rental device of claim 1, wherein:
each of the rental queue and return queue includes a queue frame configured to define a loading space of the auxiliary batteries, and a support member provided at a lower end of the queue frame to hold up and support an auxiliary battery loaded at a bottom of the queue frame, in which the support member of the rental queue selectively implements a state of supporting the loaded auxiliary battery and a state of releasing the support for the loaded auxiliary battery.

7. The auxiliary battery rental device of claim 1, wherein:
the auxiliary battery has a pair of charging terminals for charging, and
the charging unit is provided with a plurality of pairs of charging pins to come into contact with the pair of charging terminals, respectively, so as to charge the batteries loaded on the battery queue in a contact mode.

8. The auxiliary battery rental device of claim 7, wherein the charging unit is configured to allow the plurality of pairs of charging pins to be spaced apart from the charging terminals of the auxiliary battery during operation of the lift.

9. The auxiliary battery rental device of claim 1, wherein:
the battery queue is configured to discharge the loaded batteries one by one from one end of the battery queue according to a rental request of the user and load the returned auxiliary batteries onto an opposite end of the battery queue, and
the lift moves up and down the loaded auxiliary batteries such that the auxiliary battery loaded at the one end among the auxiliary batteries loaded on the battery queue is disposed at a dischargeable position, and moves up and down the loaded auxiliary batteries such that the auxiliary battery returned during the return operation is loaded on the opposite end.

10. The auxiliary battery rental device of claim 9, wherein:
the battery port is a single battery port;
the carrier is installed with a fixed vertical height equal to a height of the battery port; and
the lift moves the loaded auxiliary batteries such that the one end is positioned at a same height as a height of the carrier upon the rental operation, and moves up and down the loaded auxiliary batteries such that the opposite end is positioned at a same height as the height of the carrier upon the return operation.

11. The auxiliary battery rental device of claim 9, wherein:
the battery port includes a discharge port formed with a height corresponding to the one end of the battery queue, and a return port formed with a height corresponding to the opposite end of the battery queue;
the carrier includes a rental carrier installed with a fixed vertical height equal to a height of the discharge port, and a return carrier installed with a fixed vertical height equal to a height of the return port; and
the lift moves the loaded auxiliary batteries such that the loaded auxiliary battery at the one end is positioned at a same height as the height of the rental carrier upon the rental operation, and moves up and down the loaded auxiliary batteries such that the loaded auxiliary battery at the opposite end is positioned at a same height as the height of the return carrier upon the return operation.

12. The auxiliary battery rental device of claim 9, wherein:
the battery queue includes a queue frame configured to limit a loading space of the auxiliary batteries, and a support member provided at a lower end of the queue frame to hold up and support an auxiliary battery loaded at a bottom of the queue frame,
the support member selectively implements a state of supporting the auxiliary battery loaded at the bottom and a state of releasing the support for the loaded auxiliary battery, and
the lift is disposed below the support member.

13. An auxiliary battery rental device performing rental and return of auxiliary batteries, the auxiliary battery rental device comprising:
a battery port allowing the auxiliary batteries to be discharged therefrom or returned thereto;
a battery queue on which the auxiliary batteries to be rented or having been returned are vertically stacked and loaded;
a carrier configured to discharge the auxiliary batteries loaded on the battery queue to the battery port, or load the auxiliary batteries returned through the battery port onto the battery queue;
a lift configured to move up and down at least a part of the auxiliary batteries loaded on the battery queue;
a charging unit configured to charge at least a part of the auxiliary batteries loaded on the battery queue; and
a control unit configured to control an operation of the rental device such that rental and return operations of the auxiliary batteries are automatically performed,
wherein:
the battery queue is configured to discharge the loaded batteries one by one from one end of the battery queue according to a rental request of the user and load the returned auxiliary batteries onto an opposite end of the battery queue;
the lift moves up and down the loaded auxiliary batteries such that the auxiliary battery loaded at the one end among the auxiliary batteries loaded on the battery queue is disposed at a dischargeable position, and moves up and down the loaded auxiliary batteries such that the auxiliary battery returned during the return operation is loaded on the opposite end;
the battery port is a single battery port;
the carrier is installed with a fixed vertical height equal to a height of the battery port; and
the lift moves the loaded auxiliary batteries such that the one end is positioned at a same height as a height of the carrier upon the rental operation, and moves up and down the loaded auxiliary batteries such that the opposite end is positioned at a same height as the height of the carrier upon the return operation.

* * * * *